United States Patent
Nozawa et al.

(10) Patent No.: US 7,063,319 B2
(45) Date of Patent: Jun. 20, 2006

(54) PRINTING PLATE STACKING DEVICE AND METHOD OF JUDGING AUTHENTICITY OF SHEET MEMBER DETECTING STATE

(75) Inventors: Ryoei Nozawa, Kanagawa (JP); Hidenori Sasaki, Kanagawa (JP); Takanobe Nakamura, Kanagawa (JP); Shinji Odagiri, Kanagawa (JP); Tatsuya Fujita, Kanagawa (JP); Mutsumi Ashizawa, Kanagawa (JP); Kazuyoshi Takahashi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 535 days.

(21) Appl. No.: 10/286,945

(22) Filed: Nov. 4, 2002

(65) Prior Publication Data
US 2003/0091424 A1 May 15, 2003

(30) Foreign Application Priority Data

| Nov. 9, 2001 | (JP) | ......................... | 2001-345014 |
| Nov. 9, 2001 | (JP) | ......................... | 2001-345015 |
| Nov. 9, 2001 | (JP) | ......................... | 2001-345096 |
| Oct. 18, 2002 | (JP) | ......................... | 2002-304121 |

(51) Int. Cl.
*B65H 29/38* (2006.01)

(52) U.S. Cl. .......................... 271/258.01; 271/258.03; 414/800

(58) Field of Classification Search ................. 271/3.15, 271/3.17, 4.02, 4.03, 4.04, 258.01, 258.03; 414/798.5, 760, 768, 769, 773, 778, 800

See application file for complete search history.

(56) References Cited

U.S. PATENT DOCUMENTS

| 4,464,654 | A | * | 8/1984 | Klein | 198/810.02 |
| 4,511,904 | A | * | 4/1985 | Takahashi | 346/134 |
| 5,433,583 | A | * | 7/1995 | Sasou et al. | 414/797.3 |
| 5,965,862 | A | * | 10/1999 | Momose | 235/449 |
| 5,988,628 | A | * | 11/1999 | Mori | 271/117 |
| 6,053,495 | A | * | 4/2000 | Hara et al. | 271/263 |
| 6,146,085 | A | * | 11/2000 | Namba et al. | 414/789.9 |
| 6,471,050 | B1 | * | 10/2002 | Ikeda et al. | 198/861.1 |

* cited by examiner

*Primary Examiner*—Douglas Hess
(74) *Attorney, Agent, or Firm*—Sughrue Mion, PLLC

(57) ABSTRACT

An intermediate guide member is provided attachable and removable between a head portion and a supporting frame of a stocker for printing plates. A number of intermediate guide members is an element to set a time of starting downward movement of hooks supporting a leading end of a printing plate. Three conditions in accordance with lengths of non-detection times are set for detecting the printing plate to judge authenticity of the detection. When the hooks reach vicinities of stoppers provided at supporting bars of a reversal unit, the hooks swing, are pulled-in from above the slope, and transfer the printing plate to the stoppers. Thereafter, by rotating the supporting bars and the stoppers integrally around a shaft, the printing plate is pivoted over toward a back plate, and a lower end of the printing plate is transferred from the stoppers to a receiving plate without damaging the printing plate.

8 Claims, 21 Drawing Sheets

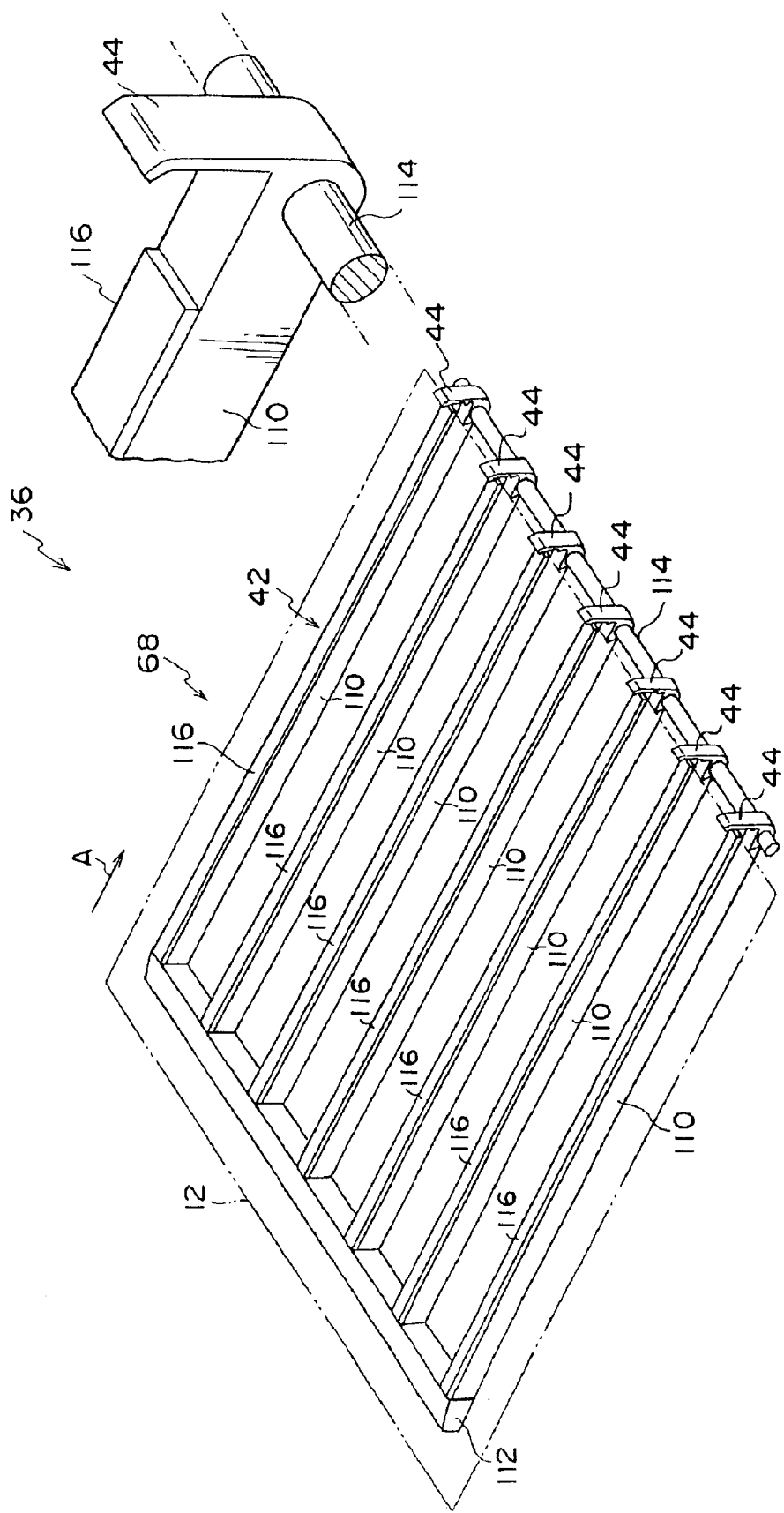

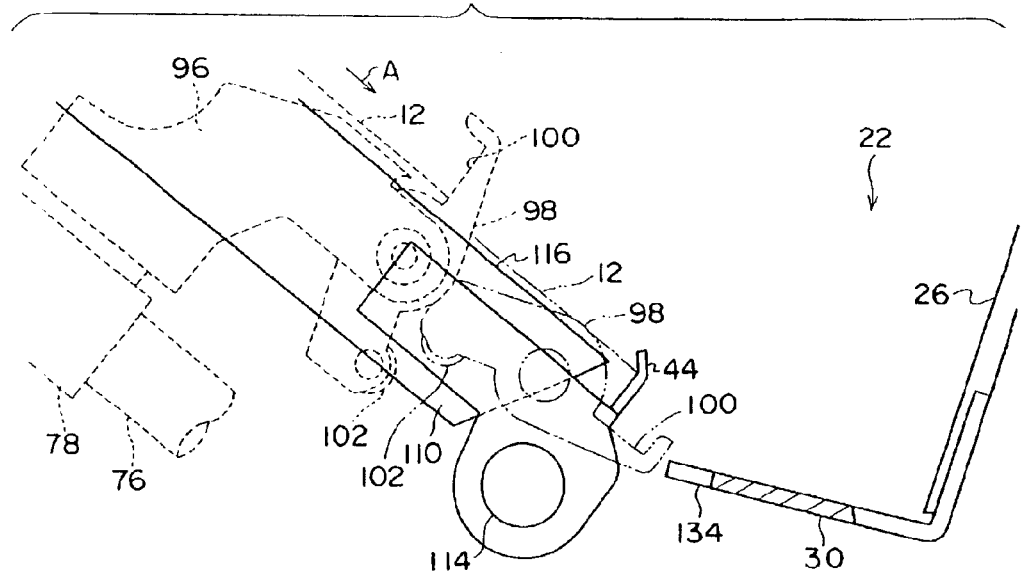
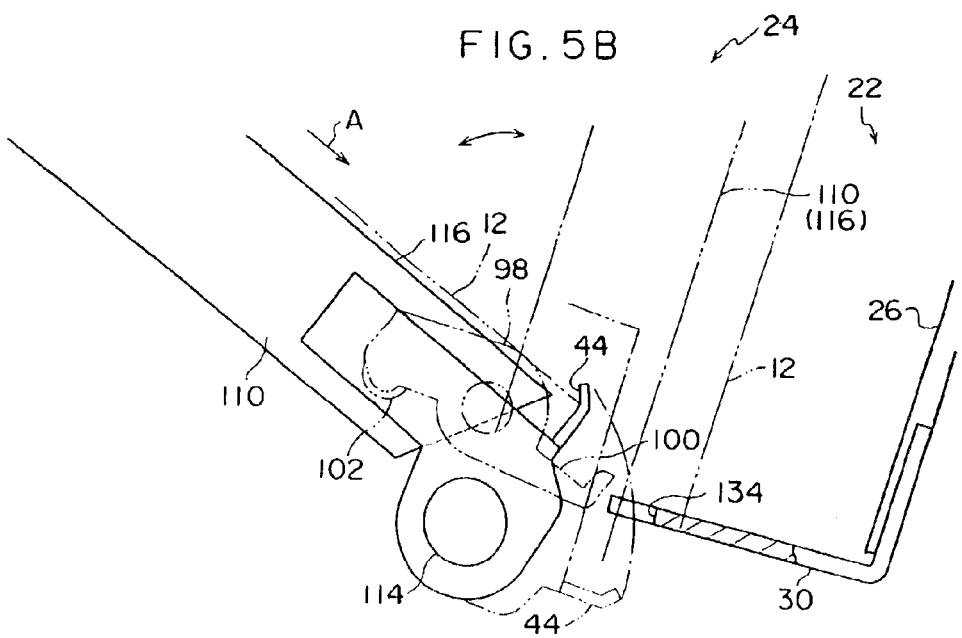

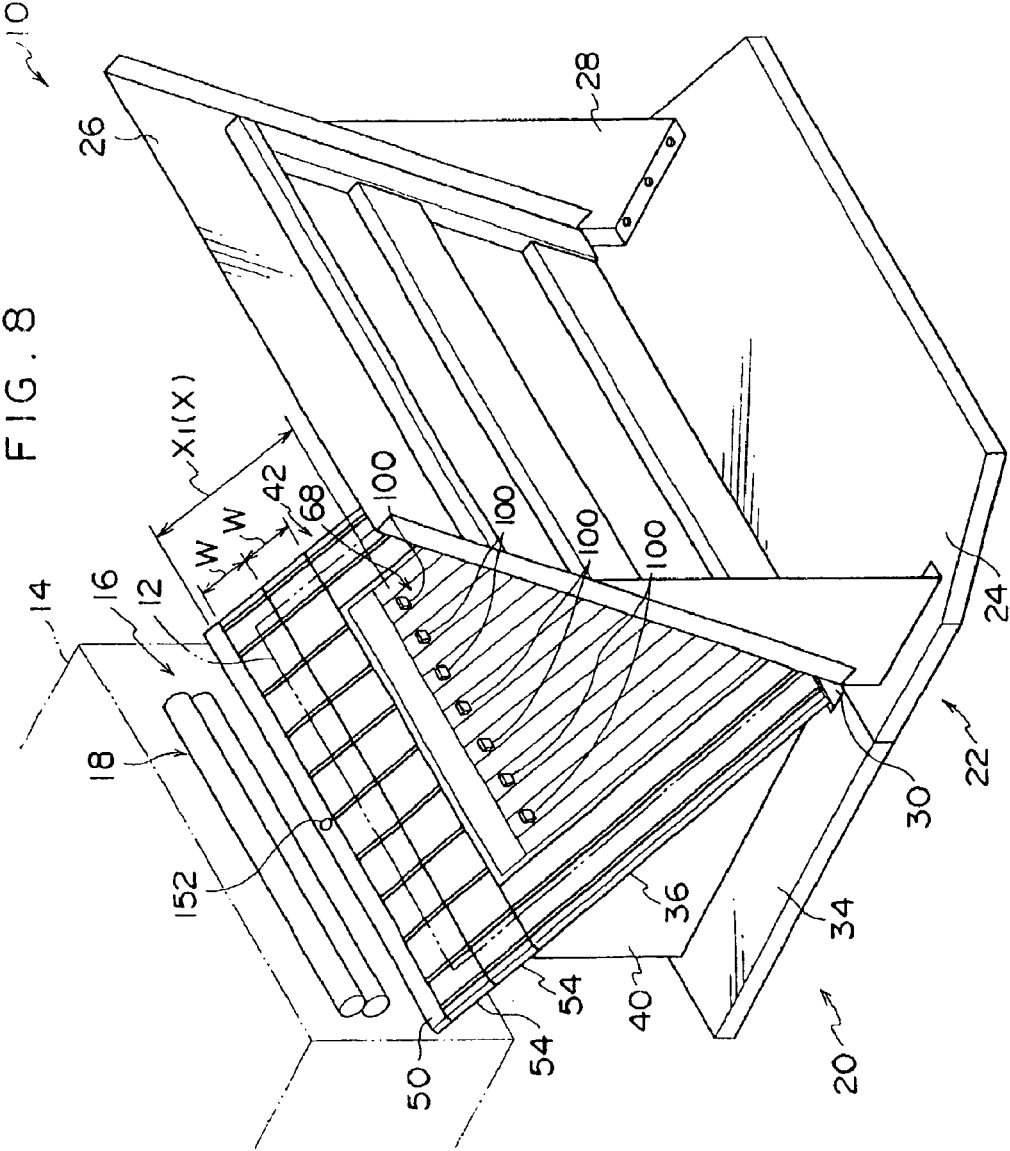

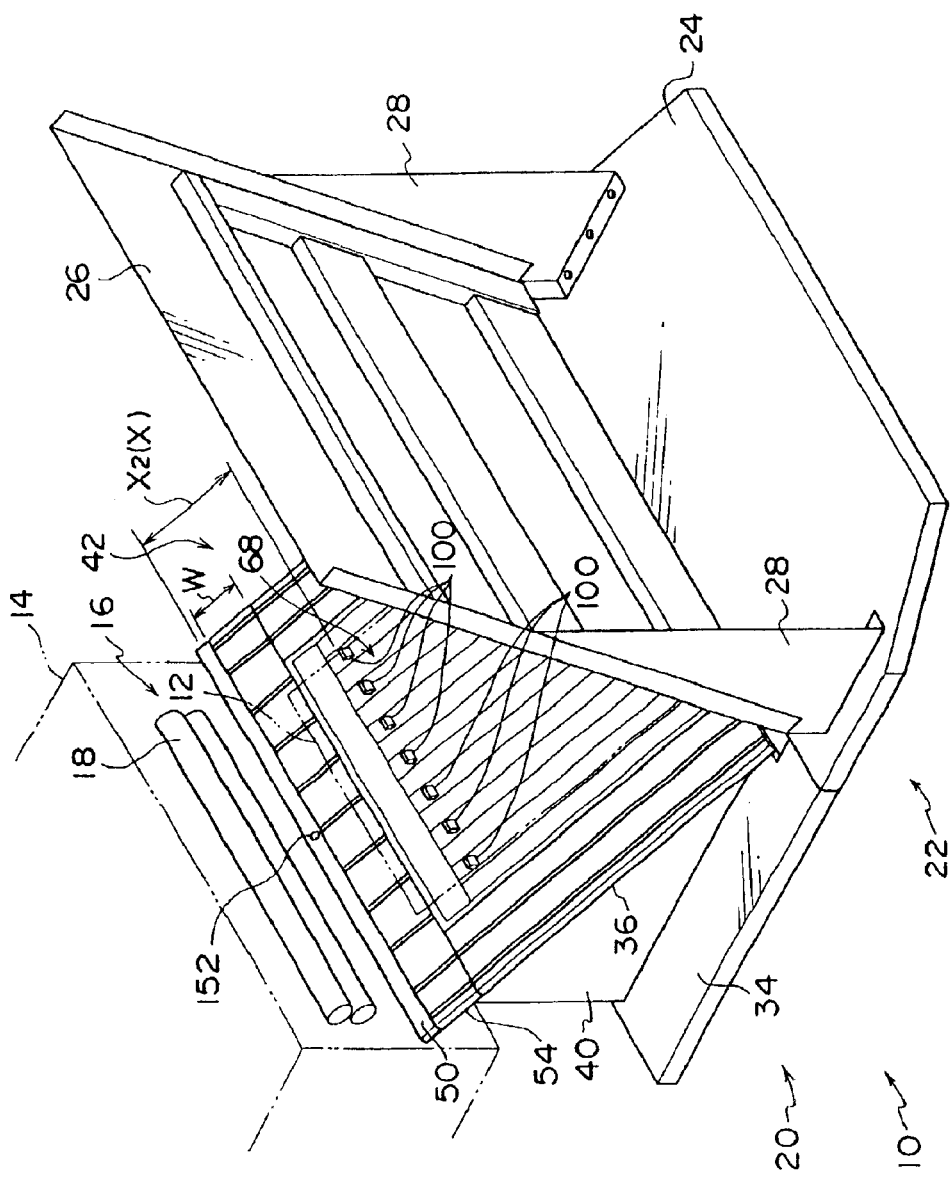

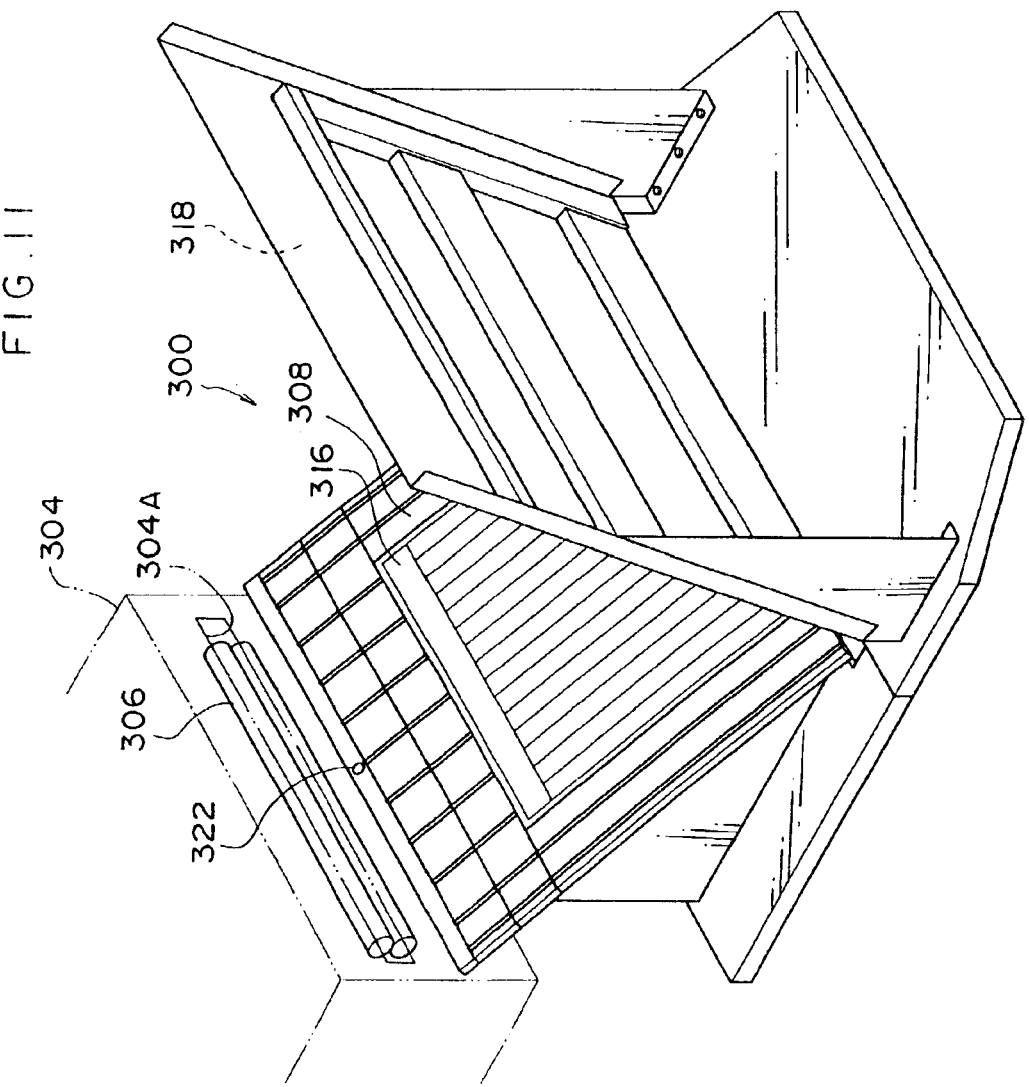

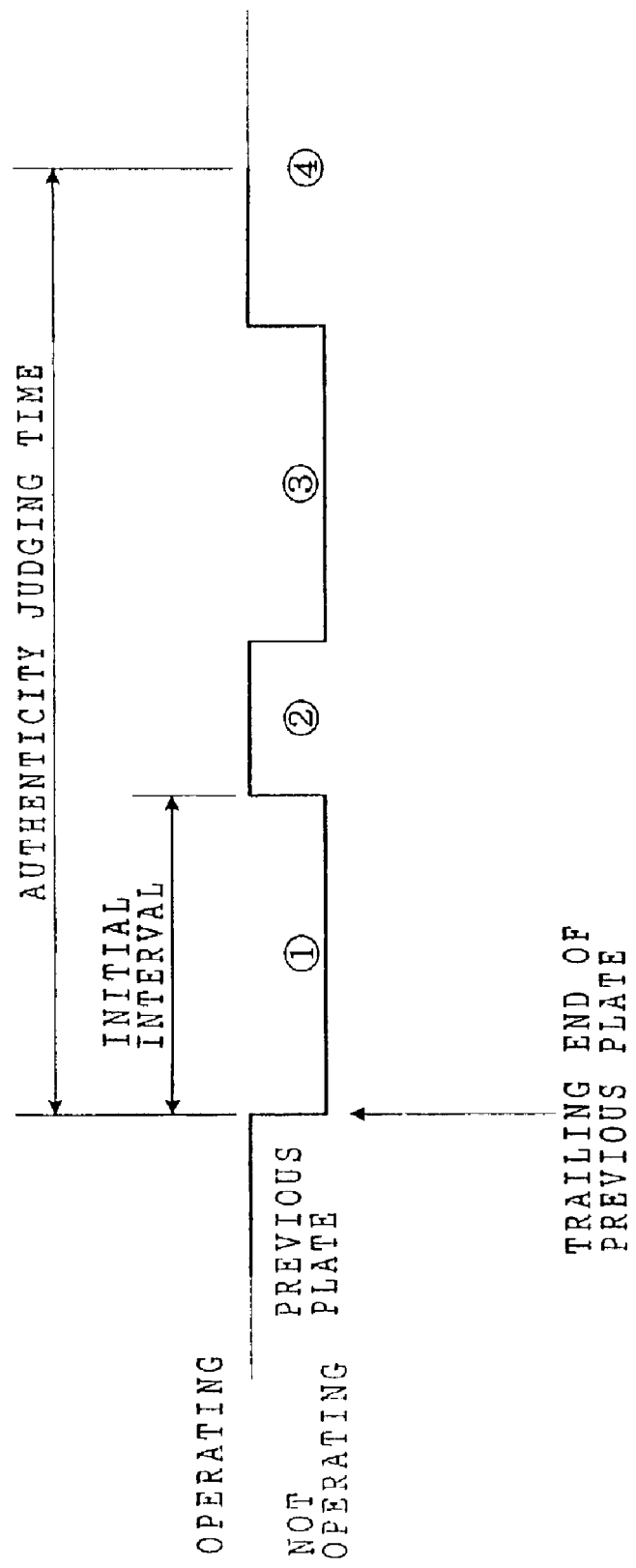

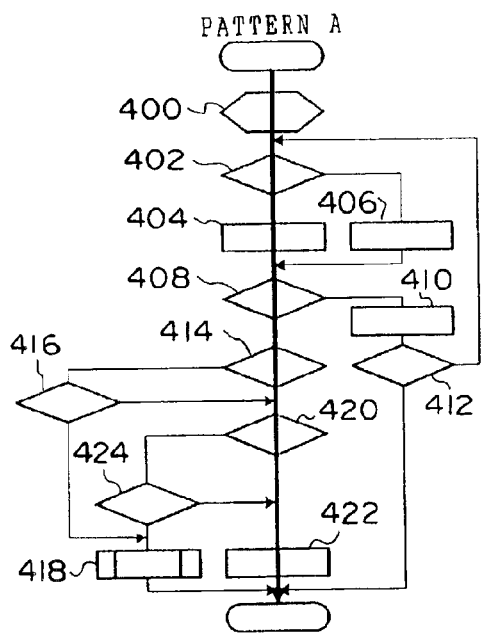
FIG. 17A PATTERN A
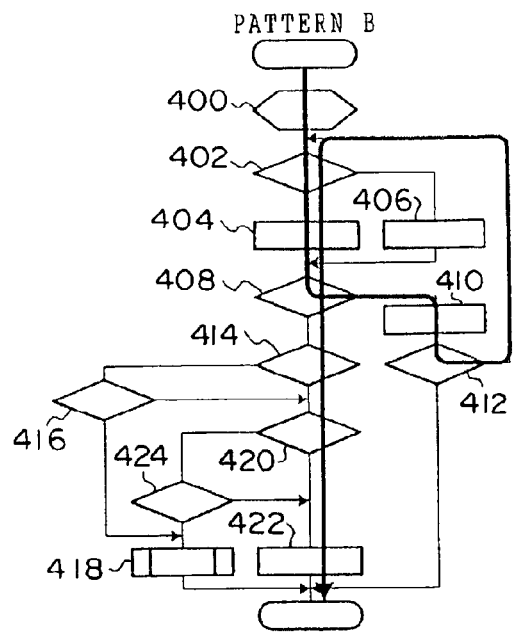
FIG. 17B PATTERN B
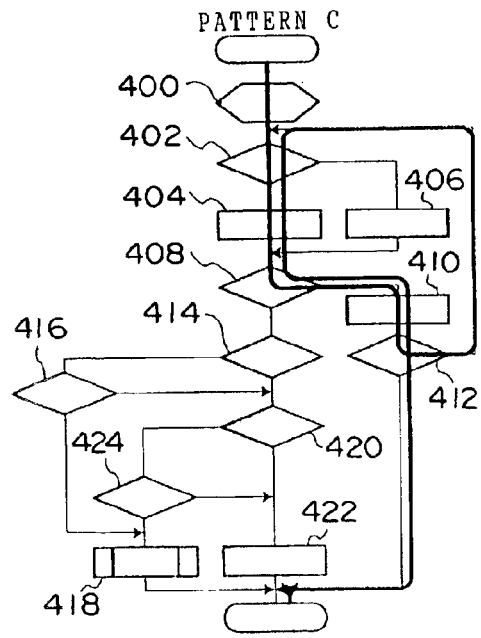
FIG. 17C PATTERN C
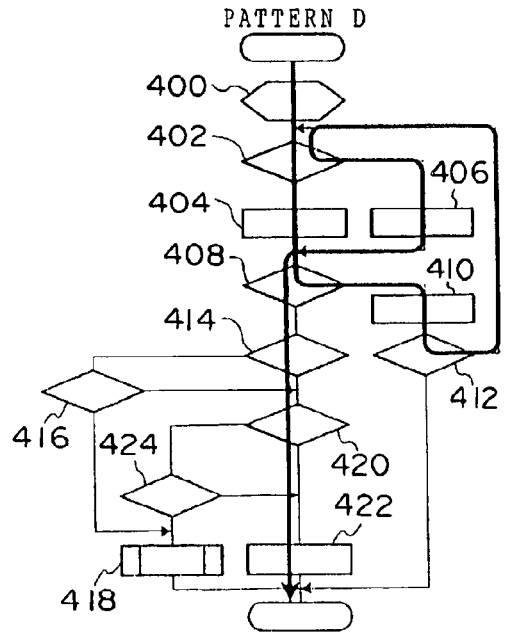
FIG. 17D PATTERN D

PRINTING PLATE STACKING DEVICE AND METHOD OF JUDGING AUTHENTICITY OF SHEET MEMBER DETECTING STATE

BACKGROUND OF THE INVENTION

1. Field of the Invention

The present invention relates to a printing plate stacking device which stacks photosensitive lithographic printing plates.

Moreover, the present invention relates to a method of judging the authenticity of a state of detecting sheet members, which judges the authenticity of the detecting state of a sheet member detecting sensor. This method is applied to an operation controlling device which is equipped with a sheet member detecting sensor which detects the leading end portion of a sheet member while the sheet member is being conveyed, and which uses the detection of the leading end portion of the sheet member by the sheet member detecting sensor as a trigger for setting the timing of the operation of a subsequent process.

2. Description of the Related Art

Photosensitive lithographic printing plates, in which a photosensitive layer is formed on a support made of aluminum or the like, are a type of photosensitive material used for printing. Photosensitive lithographic printing plates will hereinafter be called "printing plates". After being subjected to image exposure, the printing plate undergoes developing processing. The developing processing includes the respective processings of developing, rinsing, desensitizing, and drying. At the time of developing processing, the printing plates, which have been subjected to developing processing and discharged from the automatic developer, are successively stacked by a stacking device. A large number of the stacked printing plates are conveyed to the subsequent process.

Some stacking devices used in stacking printing plates are formed in a substantial V-shape as seen from the side, by a slope portion, which is inclined downwardly from the discharge opening of the automatic developer, and a stock portion, which opposes the slope portion. In such a stacking device, after a printing plate discharged from the discharge opening has been loaded on the slope portion, the slope portion is swung toward the stock portion around the lower end portion of the slope portion. The printing is thereby pivoted over and leaned up against the stock portion.

When a printing plate which has been discharged from the automatic developer is loaded on the slope portion, if the printing plate slides down the slope, when the bottom end of the printing plate abuts a stopper or the like and is stopped thereat, the bottom end portion of the printing plate may be damaged, such as may be broken or bent or the like.

Thus, there are stacking devices in which a sensor for plate detection is provided at the upper end portion of the slope portion in a vicinity of the discharge opening of the automatic developer, and a bracket, which moves downward while supporting the leading end of the printing plate, is provided along the top surface of the slope portion. In such a stacking device, when the leading end of a printing plate which is discharged out from the discharge opening of the automatic developer is detected by the plate detecting sensor, at the time when the leading end of the printing plate reaches the bracket, the bracket is moved downward in accordance with the conveying speed of the printing plate discharged from the automatic developer. Damage to the printing plate occurring when the printing plate, which is moving downward on the slope portion, stops, can thereby be prevented.

There are various sizes of printing plates having different lengthwise and widthwise dimensions. For example, in an automatic developer which subjects such printing plates to developing processing, printing plates having different widthwise dimensions and printing plates having different dimensions along the conveying direction thereof can be processed.

The stacking device is generally of a size corresponding to the largest sized printing plate. Thus, when stacking mainly small-sized printing plates, and in particular, printing plates whose dimension along the conveying direction is small, the space required for placement of the stacking device is overly large as compared with the size of the printing plates.

When the leading end of a printing plate, which is moving downward on the slope, is stopped by abutting a receiving plate provided at the stock portion, the leading end of the printing plate slides down from on the slope to onto the receiving plate. In such a case, when the printing plate is stopped on the slope, an impact is applied to the leading end of the printing plate, and the printing plate may be damaged.

In order to prevent such a situation from occurring, there is a printing plate stacking device having the following structure. Hooks which support the leading end of the printing plate move downward along the slope. When, at the bottom end of the slope, the hooks are pulled-in downwardly from the top surface of the slope, the leading end of the printing plate is transferred over to the receiving plate at the stock portion. The impact applied to the leading end of the printing plate is thereby lessened.

However, in this device as well, there are cases in which the leading end of a printing plate, which is sliding down the slope next, enters in between the receiving plate and a printing plate which has been previously stacked and leaned up at the stock portion. Thus, when the printing plate is reversed and pivoted over onto the stock portion in a state in which the lower end of the printing plate is resting on the receiving plate of the stock portion, the leading end of the printing plate may slip in between the receiving plate and a printing plate which is already stacked, or the leading end of the printing plate may bend and be damaged such as be broken or become bent or the like.

Further, a rotating plate, which rotates toward another inclined surface (stacking wall) is provided at the slope of the stacking device. At the point in time when the entire printing plate is supported at the slope, the rotating plate is rotated, and the printing plate is transferred to the stacking wall. By repeating this operation, printing plates are leaned up against and stacked at the stacking wall.

A stopper, which receives and stops the leading end portion of the printing plate, is provided at the slope. The stacking device has a structure in which, after the stopper is disposed at the top portion of the slope, while the stopper supports the leading end portion of the printing plate (i.e., the bottom end portion of the printing plate when the printing plate is on the slope), the stopper is moved toward the bottom portion of the slope in accordance with the speed of discharging the printing plate. In this way, the impact to the leading end portion of the printing plate due to the printing plate sliding down on the slope can be mitigated.

Control is carried out such that the timing for driving the stopper and the timing for rotating the rotating plate are triggered by detection by a printing plate detecting sensor provided at the uppermost end of the slope.

A reflection-type photoelectric sensor equipped with a light-projecting portion and a light-receiving portion is used as the printing plate detecting sensor. When an object to be detected is at a position at a predetermined distance from the sensor, the light irradiated from the light-projecting portion is reflected by the object to be detected and received at the light-receiving portion. Here, the object to be detected may be a printing plate. It is possible to discriminate between detection and non-detection of an object to be detected due to the presence or absence of received light.

The printing plate detecting sensor is disposed at the uppermost end of the slope in a state in which it is flush with the printing plate supporting surface. The printing plate can be detected by passing by the printing plate detecting sensor. However, if a worker is working at the region where the printing plate passes by, his/her arm or hand or a printing plate or part which the worker is holding, which has entered into the region at which a printing plate can be detected by the printing plate detecting sensor, may be mistakenly judged to be a printing plate which is being discharged from the automatic developer, and operation of the stopper and the rotating plate may be started.

In order to avoid such a situation, the printing plate detecting sensor may be disposed so as to oppose the slope and so as to be directed toward the slope surface at a bracket formed in an arch-shape. However, with such a structure, the region above the slope surface becomes narrow, and a problem arises in that the maintenance workability thereat deteriorates. Further, in order to provide such a bracket, the number of parts is increased, and the wiring and the like for the printing plate detecting sensor become complex.

SUMMARY OF THE INVENTION

In view of the aforementioned, an object of the present invention is to provide a printing plate stacking device which, by conforming to the size of the printing plates which are being stacked, prevents the space for placing the device from becoming unnecessarily large.

Another object of the present invention is to provide a printing plate stacking device which can smoothly stack printing plates without the bottom end portion of a printing plate being damaged, such as being broken or bent or the like, at the time when the printing plate is made to lean against a surface and is stacked thereat.

Yet another object of the present invention is to provide a method for judging the authenticity of the state of detecting a sheet member which, when the leading end portion of a sheet member is used as a trigger for the time for operation of a subsequent process, is capable of preventing a subsequent process from being improperly performed by judging whether or not a sheet material is transferred at predetermined intervals. The method is capable of such prevention even when a non-sheet material is detected.

A first aspect of the present invention is a printing plate stacking device which leans up and stacks, against a stock portion, a printing plate fed out from a discharge opening of a printing plate processor, the printing plate stacking device comprising: a loading portion disposed so as to oppose the stock portion, the printing plate discharged from the discharge opening being loaded on the loading portion in a state of being inclined; a head portion disposed in a vicinity of the discharge opening on an extension of an inclination of the loading portion, and guiding the printing plate discharged from the discharge opening to the loading portion; a plate detecting device provided at the head portion and detecting the printing plate discharged from the discharge opening; a supporting and guiding device provided at the loading portion, and, while supporting the printing plate, moving the printing plate downward along a top surface of the loading portion and loading the printing plate on the loading portion by moving hooks which are abutted by a discharging direction leading end of the printing plate; a reversing device leaning and stacking the printing plate, which is loaded on the loading portion, on the stock portion by tilting the printing plate over toward the stock portion; an intermediate guide portion provided so as to be attachable and removable between the head portion and the loading portion, and able to adjust an interval between the head portion and the loading portion in accordance with a length of the printing plate along the discharging direction of the printing plate; and a control device operating the supporting and guiding device at a timing based on results of detection of the plate detecting device and the interval between the head portion and the loading portion formed by the intermediate guide portion disposed between the loading portion and the head portion.

In accordance with this invention, the leading end of the printing plate discharged from the discharge opening of the printing plate processor is moved downward along the top surface of the loading portion while being supported by the hooks. The printing plate is thereby loaded on the loading portion. Thereafter, due to the printing plate being tilted over toward the stock portion by the reversal device, the printing plate is leaned up against and stacked at the stock portion.

The intermediate guide portion can be mounted between the loading portion and the head portion. In this way, when a printing plate, whose length along the discharging direction is long, is stacked, by providing the intermediate guide portion between the loading portion and the head portion, the top end portion of the large-sized printing plate can be prevented from jutting-out upwardly from the head portion.

Further, when a small-sized printing plate is stacked, the intermediate guide portion is made shorter or is removed, such that the interval between the loading portion and the head portion can be made more narrow.

At this time, on the basis of the interval between the head portion and the loading portion, which interval is formed by the intermediate guide portion disposed between the head portion and the loading portion, the control device sets the time at which the hooks are moved downward from the time when the leading end portion of the printing plate fed-out from the discharge opening is detected by the plate detecting device.

In this way, both large-sized printing plates and small-sized printing plates can be stacked without the leading end portions or the like thereof being damaged. Further, when small-sized printing plates are stacked, the space needed for placing the device does to become any larger than needed.

The present invention usually includes an adjusting device which can integrally adjust an angle of inclination from the intermediate guide portion and the loading portion to the head portion.

Conventionally, usually, the height of the discharge opening of the printing plate processor is constant, and when the interval between the loading portion and the head portion is made smaller at the same angle of inclination, the head portion is at a lower height. In contrast, in the device of the present invention, the angle of inclination can be adjusted such that the head portion can be maintained at an appropriate height. Further, when the head portion is maintained at the same height, the placement space can be made smaller when small-size printing plates are stacked.

A second aspect of the present invention is a printing plate stacking device leaning up and stacking a printing plate, which is fed-out from a discharge opening of a printing plate processor, by reversing and tilting over the printing plate after the printing plate has been moved downward in a state of being inclined at a predetermined angle, the printing plate stacking device comprising: a back plate against which the printing plate which is stacked is leaned; a receiving plate supporting a lower end of the printing plate leaning against the back plate; a slope which guides downward and supports a leading end of the printing plate discharged from the printing plate processor; a guiding and moving device guiding the printing plate downward while supporting the printing plate, by moving downwardly hooks which oppose the leading end of the printing plate on the slope; a frame which stops downward movement of the printing plate and on which the printing plate is loaded, due to the leading end of the printing plate being received and supported from the hooks of the guiding and moving device, at a lower end portion of the slope, by a stopper provided at the lower end portion of the slope; and a swinging device which tilts the printing plate over toward the back plate while transferring the lower end of the printing plate to the receiving plate, by rotating the frame, on which the printing plate is loaded, toward the back plate integrally with the stopper.

In accordance with this invention, a stopper is provided at the bottom end of the frame forming the slope. The leading end of the printing plate is supported by the hooks which move downward along the slope. Note that the stopper may be formed by resin, rubber, metal, or another material. However, in order to reduce the impact at the time when the printing plate abuts the stopper, the stopper is usually formed of resin or rubber.

Due to the swinging device rotating the frame, at which the stopper is provided, toward the back plate, the printing plate is leaned up against the back plate. At this time, the leading end of the printing plate is transferred from the stopper to the receiving plate while the stopper is rotated integrally with the frame.

In this way, the printing plate is transferred from the stopper to the receiving plate in a state in which the printing plate is inclined close to an upright state. Thus, the leading end of the printing plate does not enter between the receiving plate and a printing plate which is already leaned up, and damage, such as breaking or bending or the like, due to the printing plate being bent or the like does not occur.

In the second aspect of the present invention, usually, when the leading end of the printing plate fed-out from the discharge opening of the printing plate processor reaches a predetermined distance from the guiding and moving device, the guiding and moving device moves the hooks downwardly at a moving speed which is slower, by a predetermined ratio, than a speed at which the printing plate is fed-out from the printing plate processor.

Due to the above-described feature of the present invention, the hooks are moved downward at a speed which is slightly slower than the feed-out speed of the printing plate, at the time when the leading end of the printing plate reaches a predetermined distance from the hooks. In this way, when the leading end of the printing plate abuts the hooks, it is possible to reliably prevent an impact or the like from being applied to the leading end of the printing plate.

When a large-size printing plate, i.e., a printing plate whose length along the feed-out direction is long, moves apart from the discharge opening of the printing plate processor, the printing plate is fed downward in a state in which the leading end thereof is reliably supported by the hooks. With a small-sized printing plate, i.e., a printing plate whose length along the feed-out direction is short and whose plate thickness of the support is relatively thick, there is little flexure. Thus, when the trailing end of such a printing plate is fed-out from the discharge opening of the printing plate processor, if there is some distance between the leading end and the hooks, the leading end may fall down toward the hooks. In this case as well, the printing plate is reliably received and stopped by the hooks.

The timing for starting the lowering of the hooks is usually, for example, when the leading end of the printing plate has reached about 30 mm from the hooks. The moving speed, which is the lowering speed, of the hooks at this time is usually a speed which is about 3% lower than the feed-out speed at which the printing plate is fed-out from the printing plate processor.

In the second aspect of the present invention, usually, the stopper is a plurality of stoppers provided at predetermined intervals along a direction orthogonal to the moving direction of the printing plate, and cut-outs which respectively oppose the plural stoppers are formed in the receiving plate. When the plurality of stoppers are rotated by the swinging device, the stoppers pass through the cut-outs, and move to beneath the receiving plate.

In accordance with the above-described feature, when the plurality of stoppers are rotated, they pass through the cut-outs formed in the receiving plate, and move to beneath the receiving plate. In this way, the leading end of the printing plate can be smoothly transferred from the stoppers to the receiving plate.

Moreover, the second aspect of the present invention usually includes a pull-in device which, in a vicinity of the stopper, pulls-in the downwardly moving hooks from the top surface of the slope.

In this way, when the printing plate is rotated toward the back plate, the hooks do not obstruct the transfer of the leading end of the printing plate from the stopper to the receiving plate. Thus, the printing plate can be transferred smoothly from the stopper to the receiving plate.

A third aspect of the present invention is a method for judging authenticity of a state of detection of a sensor. The method is used in an operation controller comprising the sensor for detecting a leading edge of a sheet member which is being conveyed. The operation controller uses detection of the leading edge of the sheet member by the sensor as a trigger for a timing of operation of a subsequent process. The method comprises judging that the detection of the leading edge of the sheet member is authentic when the detection by the sensor for a predetermined time or longer is established after non-detection of the sheet member for another predetermined time or longer, and proceeding to the subsequent process.

A fourth aspect of the present invention is another method for judging authenticity of a state of detection of a sensor. The method is also used in an operation controller comprising the sensor for detecting a leading edge of a sheet member which is being conveyed. The operation controller uses detection of the leading edge of the sheet member by the sensor as a trigger for a timing of operation of a subsequent process. The method comprises judging that the detection of the leading edge of the sheet member is false when the detection for a predetermined time or longer by the sensor is established after non-detection of the sheet member for a time less than another predetermined time, and carrying out error processing.

In this way, accidents or problems can be prevented in advance, and it is possible to discover problems at an early stage.

In the third or fourth aspect of the present invention, usually, the sheet member is a photosensitive lithographic printing plate, and the subsequent process is stocking by a stocker. The stocker is disposed so as to correspond to an exit of a processing section for the photosensitive lithographic printing plate, and stacks the photosensitive lithographic printing plate which is discharged from the exit.

In the third or fourth aspect of the present invention, when the sheet member is a photosensitive lithographic printing plate, the method further comprises carrying out subsequent processing if it is judged that the sensor indication of presence of a sheet member is accurate, the subsequent processing including stacking the photosensitive lithographic printing plate.

In this way, by judging the authenticity of the detection by the sensor, photosensitive lithographic printing plates can be stacked efficiently.

In the third or fourth aspect of the present invention, usually, the step of stacking includes guiding the photosensitive lithographic printing plate downward along a slope. During guiding, the step of stacking includes receiving a leading end portion of the photosensitive lithographic printing plate in a supporting member movable along the slope and stopping the photosensitive lithographic printing plate. After stopping the photosensitive lithographic printing plate, the step of stacking includes transferring the photosensitive lithographic printing plate to a stocking wall by rotating a plate forming a part of the surface of the slope.

The above-described operations of the stocker depend on the timing of the discharging of the photosensitive lithographic printing plate. Thus, when there is misdetection by the sensor and needless operation is carried out, there is the possibility that improper functioning may occur, and in particular, that a photosensitive lithographic printing plate will be discharged onto the slope before the rotating plate has returned. Thus, by reliably judging the authenticity of the detection by the sensor, improper functioning such as that described above can be prevented from occurring.

BRIEF DESCRIPTION OF THE DRAWINGS

FIG. 4A is a perspective view of main portions showing a schematic structure of a reversing unit.

FIG. 4B is a perspective view of main portions of a supporting bar, showing a stopper provided at a distal end.

FIG. 5A is a schematic diagram showing a vicinity of the stopper, and showing transfer of the printing plate from the hook to the stopper.

FIG. 5B is a schematic diagram showing the vicinity of the stopper, and showing transfer of the printing plate from the stopper to a receiving plate.

FIG. 8 is a schematic perspective view of a stocker provided with two intermediate guide members.

FIG. 9 is a schematic perspective view of a stocker having one intermediate guide member.

FIG. 11 is a perspective view of a stocker relating to another embodiment.

FIG. 15 is a time chart showing operating and non-operating states by a printing plate detecting sensor.

FIG. 17A is a flowchart of pattern A of Table 1 based on the flowchart of FIG. 6.

FIG. 17B is a flowchart of pattern B of Table 1 based on the flowchart of FIG. 6.

FIG. 17C is a flowchart of pattern C of Table 1 based on the flowchart of FIG. 6.

FIG. 17D is a flowchart of pattern D of Table 1 based on the flowchart of FIG. 6.

DESCRIPTION OF THE PREFERRED EMBODIMENTS

Embodiments of the present invention will be described hereinafter with reference to the drawings.

Figure 1:
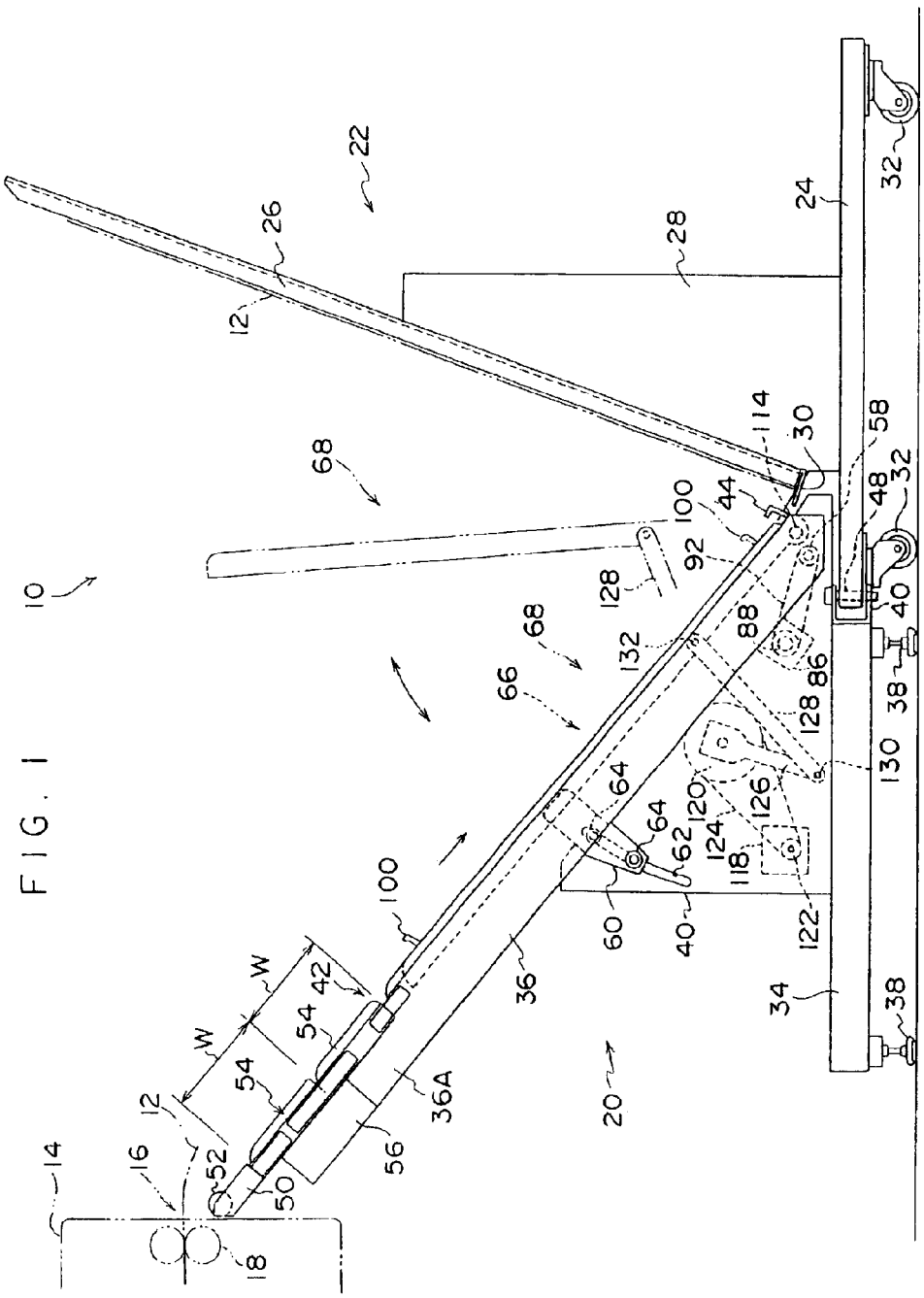
FIG. 1 is a schematic structural view of a stocker applied to an embodiment of the present invention.

FIG. 1 shows the schematic structure of a stocker 10 which is a printing plate stacking device to which the present invention is applied. A printing plate 12 of the stocker 10 has a general structure in which a photosensitive layer is formed on a support formed from an aluminum plate having a plate thickness of about 0.1 mm to 0.5 mm. The printing plate 12 may be any conventional plate, such as a CTP thermal plate or a photopolymer plate. The support is not limited to aluminum, and may be formed of an arbitrary material such as resin or the like.

The stocker 10 is provided adjacent to a discharge opening 16 of an automatic developer 14 which subjects the printing plate 12 to developing processing. The stocker 10 stacks the printing plate 12 for which developing processing has been completed and which has been nipped by a discharge roller pair 18 and fed out from the discharge opening 16.

The stocker 10 has a slope portion 20 and a stock portion 22. The slope portion 20 is disposed at the discharge opening 16 side of the automatic developer 14, such that a substantially V-shaped configuration is formed between the slope portion 20 and the stock portion 22.

At the stock portion 22, a back plate 26 is provided on a base 24. The back plate 26 is fixed on the base 24, and is inclined at a predetermined angle by a supporting plate 28 such that the bottom end of the back plate 26 is at the slope portion 20 side.

A receiving plate 30 projects from the bottom end of the back plate 26 at the stock portion 22 substantially orthogonally to the back plate 26, so as to be directed toward the slope portion 20.

In this way, at the stock portion 22, the printing plates 12 are leaned up against and stacked on the back plate 26 in a state in which the lower end portions of the printing plates 12 abut the receiving plate 30.

A plurality of casters 32 are provided at predetermined positions at the base 24 of the stock portion 22. In this way, the stock portion 22 can move, with a large number of printing plates 12 being stacked and loaded on the back plate 26, and can transport the printing plates 12.

On the other hand, at the slope portion 20, a supporting frame 36 is provided on a base 34. Further, the slope portion 20 is supported on a floor surface by a plurality of legs 38 provided at the base 34, and is disposed at a predetermined position with respect to the automatic developer 14.

The supporting frame 36 is inclined at a predetermined angle such that the stock portion 22 side of a supporting plate 40 provided at the base 24 is the lower side. A slope 42 is formed at the top surface side of the supporting frame 36 of the slope portion 20. The printing plate 12, which is fed out from the discharge opening 16 of the automatic developer 14, moves downward on the slope 42 and is loaded on the slope 42.

The lower end of the supporting frame 36 reaches the substantial bottom of the back plate 26 on the base 24 of the stock portion 22. Further, stoppers 44 are provided at the lower portion of the supporting frame 36. The printing plate 12 is loaded on the slope 42 in a state in which the leading end of the printing plate 12 along the discharging direction (the direction of arrow A), which leading end is the lower end, abuts the stoppers 44. At the slope portion 20 and the stock portion 22, the base 24 is fixed to the base 34 by pins 48 being inserted and connected in a state in which the base 24 of the stock portion 22 has entered into a channel 46 provided in the base 34 of the slope portion 20.

A head portion 50 is provided at the distal end portion of the supporting frame 36 at the side near the discharge opening 16 of the automatic developer 14. A guide roller 52 is mounted to the head portion 50. The printing plate 12, which is fed out from the discharge opening 16, can smoothly move downward on the slope 42 due to the guide roller 52.

A plurality of intermediate guide members 54, each having a predetermined width W, can be mounted to the supporting frame 36 between the supporting frame 36 and the head portion 50. In this way, at the slope portion 20, the length of the slope 42 can be changed. Namely, at the slope portion 20, by mounting a number of the intermediate guide members 54 which number corresponds to the length of the printing plate 12 which is to be stacked, the length of the slope 42 can be made to correspond to the length of the printing plate 12 which is to be stacked.

A mounting frame 36A is formed at the top end portion of the supporting frame 36. The head portion 50 or the head portion 50 and the intermediate guide members 54 can be mounted to the mounting frame 36A when the intermediate guide members 54 are not provided, or when there are few of the intermediate guide members 54 and the intermediate guide members 54 do not jut out from the mounting frame 36A.

When a large number of the intermediate guide members 54 are provided, a connecting frame 56 is mounted to the mounting frame 36A so as to extend the mounting frame 36A. The intermediate guide members 54, which jut out from the mounting frame 36A, can be mounted to the connecting frame 56.

In this way, the slope 42 can reliably be prevented from bending even at times when a large number of intermediate guide members 54 are mounted to the supporting frame 36.

On the other hand, a shaft 58 is provided at the lower end portion of the supporting frame 36. The shaft 58 is rotatably supported at the supporting plate 40. The supporting frame 36 can thereby swing around the shaft 58.

A bracket 60 is mounted to the supporting frame 36. The bracket 60 opposes an elongated hole 62 formed in the supporting plate 40 in a circular-arc shape whose center is the shaft 58. The bracket 60 can fix the supporting frame 36 to the supporting plate 40 by the bracket 60 being fastened to the supporting plate 40 by a bolt 64, which is inserted into an unillustrated mounting hole formed in the bracket 60, being inserted into the elongated hole 62.

At this time, by using the elongated hole 62 which is formed in a circular arc-shape whose center is the shaft 58, the supporting frame 36 can be fixed at an arbitrary angle of inclination within a predetermined range. Namely, at the slope portion 20, the angle of inclination of the slope 42 can be adjusted by using the elongated hole 62 and the bracket 60 as an adjusting device.

A slide unit 66 which forms a movement guiding device, and a reversal unit 68 which forms a reversing device, are provided within the supporting frame 36.

Figure 2:
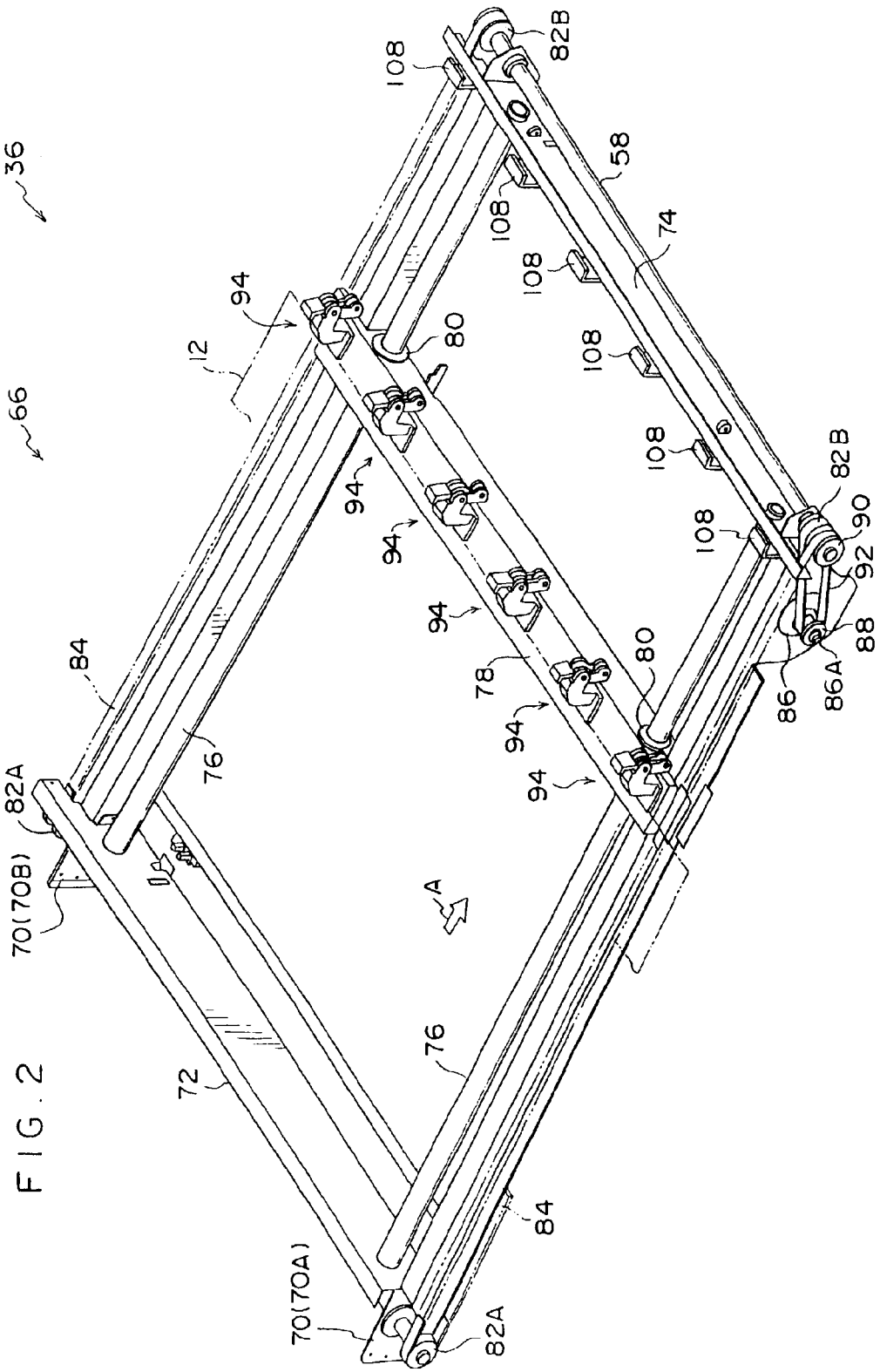
FIG. 2 is a perspective view of main portions showing a schematic structure of a slide frame provided as a supporting guiding device at the stocker.

The schematic structure of the slide unit 66 provided within the supporting frame 36 is shown in FIG. 2. The schematic structure of the reversal unit 68 is shown in FIG. 4A. At the stocker 10, the slide unit 66 is disposed at the lower side, and the reversal unit 68 is disposed so as to overlap on the upper side of the slide unit 66.

As shown in FIG. 2, the slide unit 66 is equipped with a pair of side plates 70 (70A, 70B) which are provided within the supporting frame 36 (not shown in FIG. 2). The upper end portions of the pair of side plates 70 are connected by a connecting plate 72, and the lower end portions are connected by a connecting plate 74, such that a substantially rectangular configuration is formed.

A pair of guide shafts 76 spans between the connecting plates 72, 74 in vicinities of the side plates 70. A slide bar 78 spans between the pair of guide shafts 76. Slide bearings 80 are mounted to the slide bar 78. The guide shafts 76 are inserted through the slide bearings 80. In this way, the slide bar 78 can move along the axes of the guide shafts 76.

Pulleys 82A, 82B are mounted, so as to be freely rotatable, to each of the side plates 70 in vicinities of the connecting plates 72, 74. Endless moving belts 84 are trained between the pulleys 82A, 82B. The pulleys 82B, which are disposed in a vicinity of the connecting plate 74 at the lower end side, are mounted to the shaft 58 which is suspended between the side plates 70A, 70B so as to be freely rotatable.

The distal end portions of the slide bar 78 which project from the side plates 70A, 70B are connected to the moving belts 84. In this way, as the moving belts 84 rotate and move, the slide bar 78 can move up and down the slope 42 (see FIG. 1), i.e., can move in the direction of arrow A and in the direction opposite to the direction of arrow A.

A raising/lowering motor 86 is mounted to the one side plate 70A. A pulley 88 is mounted to a rotating shaft 86A of the raising/lowering motor 86. A pulley 90, which opposes the pulley 88, is mounted to the shaft 58 so as to be adjacent to the pulley 82B. An endless driving belt 82 is trained between the pulley 90 and the pulley 88 of the raising/lowering motor 86.

In this way, the slide bar 78 is moved by rotation of the shaft 58 due to the driving of the raising/lowering motor 86.

A plurality of receiving guides 94 are mounted to the slide bar 78. The receiving guides 94 are mounted to the slide bar 78 so as to be disposed at predetermined intervals along the widthwise direction of the printing plate 12 which is the longitudinal direction of the slide bar 78.

Figure 3A:
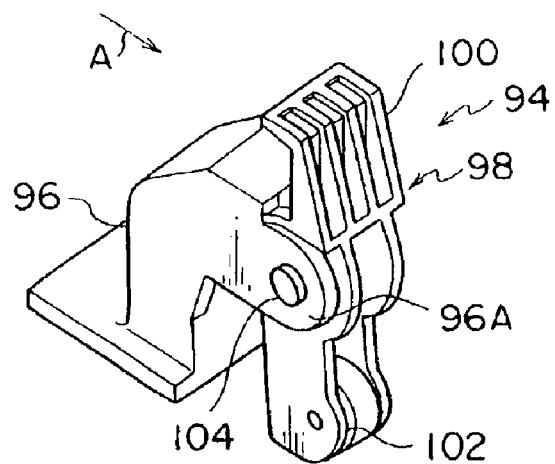
FIG. 3A is a perspective view showing a schematic structure of a receiving bracket at which hooks are provided.
Figure 3B:
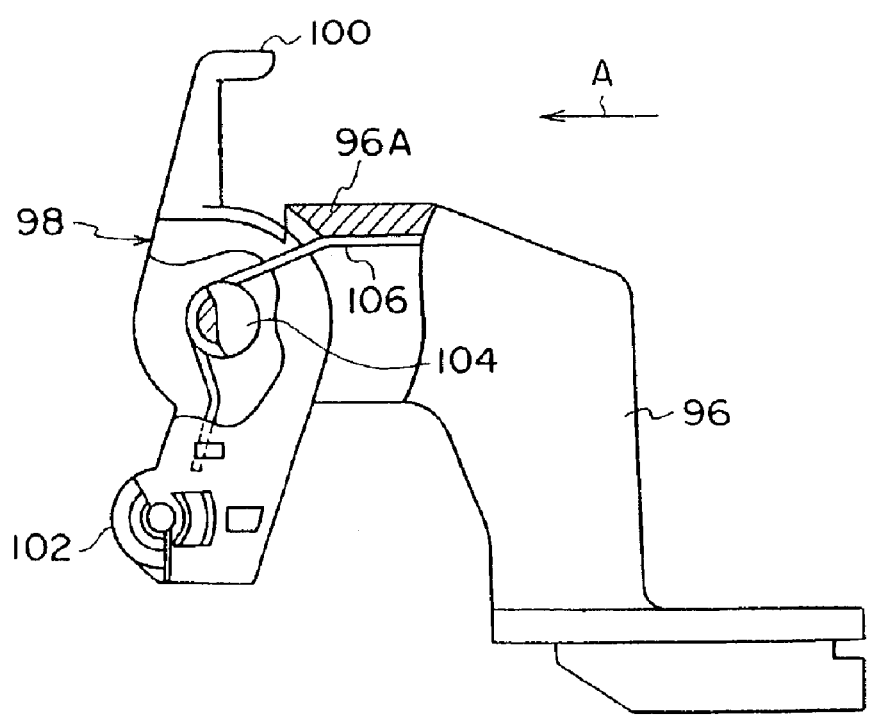
FIG. 3B is a partially-broken schematic side view of the receiving guide as seen from one side orthogonal to a moving direction of a printing plate.

As shown in FIGS. 3A and 3B, the receiving guide 94 has a bracket 96 whose configuration as viewed from the side is substantially L-shaped. The bracket 96 is mounted such that a distal end portion 96A is oriented toward the downstream side in the moving direction of the printing plate 12 (the direction of arrow A).

A swing arm 98 is mounted to the distal end portion 96A of the bracket 96. A hook 100, which opposes the leading end of the printing plate 12, is formed at one longitudinal direction side of the swing arm 98. A guide roller 102 is provided at the other end side. Further, the hook 100 is disposed at the top side of the swing arm 98, i.e., at the top side of the swing arm 98 as shown in FIGS. 3A and 3B. The longitudinal direction intermediate portion of the swing arm 98 is rotatably supported at the distal end portion 96A of the bracket 96 by a pin 104, and therefore, can rotate (swing) with the pin 104 as the axis of rotation (swinging).

As shown in FIG. 1 and FIG. 3B, a spring 106 is interposed between the bracket 96 and the swing arm 98. The spring 106 urges the hook 100 of the swing arm 98 to project at the top surface side of the slope 42. Further, the swing arm 98 is pivoted over by being swung around the pin 104 against the urging force of the spring 106, and the hook 100 is pulled-in from the slope 42.

Namely, the guide roller 102 of the swing arm 98 swings so as to be placed at the bracket 96 side, against the urging force of the spring 106. Then, the hook 100 is inclined toward the downstream side in the moving direction of the printing plate 12, and enters into the supporting frame 36.

As shown in FIG. 2, stop plates 108, which oppose the respective receiving guides 94, are provided at the lower side connecting plate 74 of the slide unit 66. The slide bar 78 moves to a predetermined position in a vicinity of the connecting plate 74, and the stop plates 108 abut the guide rollers 102 of the swing arms 98 provided at the receiving guides 94.

Downward movement of the guide rollers 102 provided at the receiving guides 94 is thereby impeded. Then, the swing arms 98 swing in directions of tilting the hooks 100.

At the stocker 10, at the time when the leading end of the printing plate 12, which is discharged from the discharge opening 16 of the automatic developer 14, is a predetermined distance from the hooks 100, the raising/lowering motor 86 is driven, and the slide bar 78 is moved at the discharging speed of the printing plate 12 from the automatic developer 14, or at a speed which is slightly slower than the conveying speed. In this way, as the hooks 100 are in the midst of their downward movement, the leading end of the printing plate 12 abuts and is supported by the hooks 100, and the printing plate 12 moves downward on the slope 42.

In the present embodiment, as an example, at the time when the leading end of the printing plate 12 comes to about 30 mm from the hooks 100, the raising/lowering motor 86 is driven such that the moving speed is about 3% slower than the discharging speed of the printing plate 12. Note that the timing of the downward movement of the hooks 100 and the speed of moving downward are not limited to these values.

On the other hand, as shown in FIGS. 4A and 4B, at the reversal unit 68, a plurality of supporting bars 100 are disposed at predetermined intervals so as to intersect the moving direction of the printing plate 12. The upper end portions of the supporting bars 110 are connected by a connecting bar 112. The lower end portions of the supporting bars 110 are connected by a shaft 114. On the whole, a substantially rectangular frame is formed.

Further, a guide member 116 is provided at each of the supporting bars 110. The printing plate 12 is supported by the guide members 116.

When the reversal unit 68 is accommodated within the supporting frame 36 so as to overlap with the slide unit 66 and so as to be disposed at the upper side of the slide unit 66, the hooks 100 of the receiving guides 94 provided at the slide unit 66 project from between the supporting bars 110 (this state is not illustrated). At this time, the printing plate 12, whose leading end is supported by the hooks 100, moves on the guide members 116.

On the other hand, as shown in FIGS. 4A and 4B, the stoppers 44 are provided at the bottom end portions of the respective supporting bars 110. As shown in FIGS. 1, 4A and 4B, the stoppers 44 are formed at the supporting bars 110 such that, when the reversal unit 68 is accommodated within the supporting frame 36, the stoppers 44 project at the top surface side of the slope 42.

In this way, as shown in FIG. 5A, the leading end of the printing plate 12 supported by the hooks 100 opposes the stoppers 44 at the lower end portion of the slope 42.

At this time, the receiving guides 94 provided at the slider unit 66 move further downward. The guide rollers 102 of the receiving guides 94 abut the stop plates 108 (see FIG. 2), and the swing arms 98 swing in the direction of pulling-in the hooks 100. In this way, the supporting of the leading end of the printing plate 12 by the hooks 100 is cancelled. The leading end of the printing plate 12 thereby abuts the stoppers 44, movement of the printing plate 12 on the slope 42 is stopped, and the printing plate 12 is supported on and loaded on the supporting bars 110 provided at the reversal unit 68. Note that, as shown in FIG. 4B, the distal ends, or top ends, of the stoppers 44 are slightly bent. In this way, the leading end of the printing plate 12 transferred from the hooks 100 can be reliably received.

As shown in FIG. 1, the shaft 114 provided at the reversal unit 68 is rotatably supported at the supporting plate 40. The reversal unit 68 can thereby swing toward the stock portion 22 around the shaft 114.

A swing motor 118 and a pulley 120 are provided at the slope portion 20 on the base 34, with the swing motor 118 being above. A pulley 122 is provided on the rotating shaft of the swinging motor 118. An endless driving belt 124 is trained between the pulley 122 and the pulley 120. In this way, the pulley 120 is rotated by the driving of the swinging motor 118.

One end of a link lever 126 is mounted to the pulley 120. One end of a link arm 128 is rotatably connected via a pin 130 to the other end of the link lever 126. The other end of the link arm 128 is rotatably connected to the supporting bar 110 of the reversal unit 68 via a pin 132.

In this way, when the pulley 120 is rotated, the link lever 126 pushes the reversal unit 68 out toward the stock portion 22. At this time, due to the reversal unit 68 being supported so as to be rotatable around the shaft 114, the reversal unit 68 rotates toward the stock portion 22 with the shaft 114 as the axis of this rotation.

Due to the rotation of the reversal unit 68, the printing plate 12, which is supported by the supporting bars 110 of the reversal unit 68 is tilted over toward the stock portion 22, and is pivoted toward the back plate 26 of the stock portion 22. At this time, the stoppers 44, which are provided at the bottom ends of the supporting bars 110, rotate integrally with the supporting bars 110 in the state of supporting the bottom end of the printing plate 12.

As shown in FIG. 5B, cut-outs 134 are formed in the receiving plate 30 provided at the stock portion 22, so as to oppose the stoppers 44 provided at the supporting bars 110 of the reversal unit 68.

The stoppers 44 provided at the supporting bars 110 and the receiving plate 30 of the stock portion 22 overlap at the time when the stoppers 44 rotate integrally with the supporting bars 110. When the stoppers 44 and the receiving plate 30 overlap, the stoppers 44 pass through the interiors of the cut-outs 134 formed in the receiving plate 30.

In this way, when the stoppers 44 move toward the side beneath the receiving plate 30, the leading end of the printing plate 12 supported by the stoppers 44 abuts the receiving plate 30. Then, downward movement of the printing plate 12 is impeded, and the printing plate 12 is transferred to the stock portion 22 and pivoted onto the back plate 26 so as to be leaned there against and held thereat.

Figure 6:
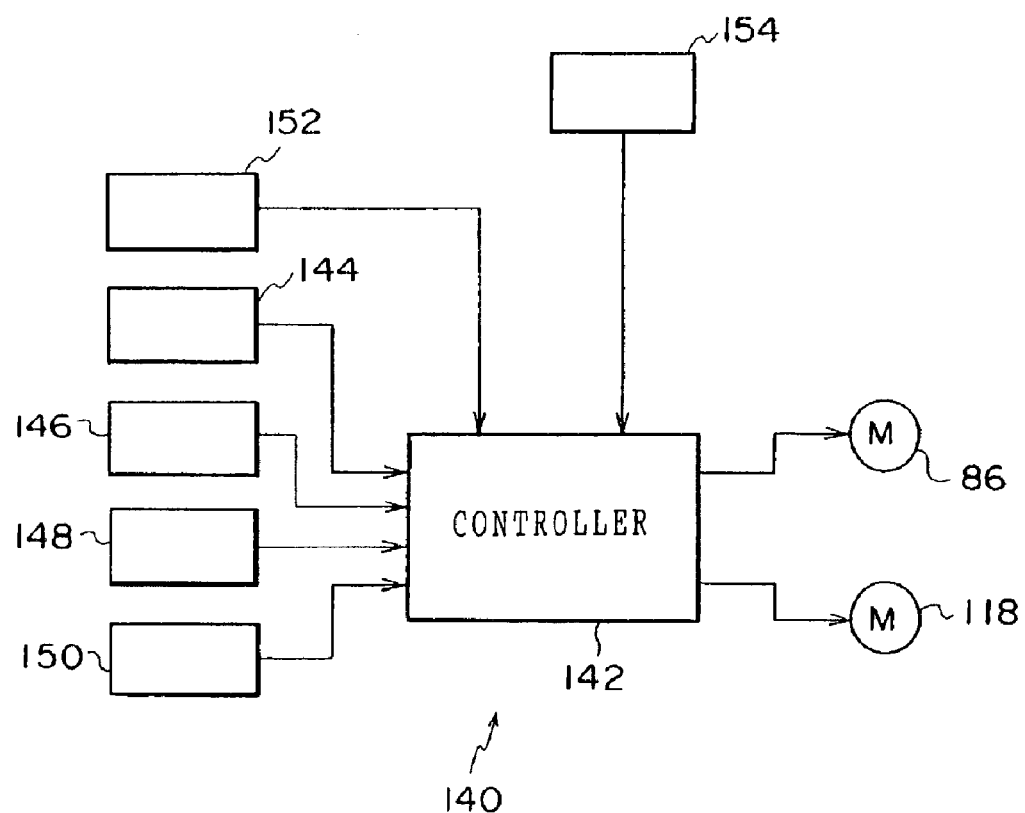
FIG. 6 is a schematic structural view of a control section provided at the stocker.

The schematic structure of a control portion 140 provided at the slope portion 20 of the stocker 10 is shown in FIG. 6. A controller 142 equipped with a microcomputer (not shown) is provided at the control portion 140. The raising/lowering motor 86 and the swing motor 118 are connected to the controller 142.

A standby position sensor 144 and a lower end position sensor 146 for the slide unit 66, and an original position sensor 148 and a reversal position sensor 150 for the reversal unit 68, are connected to the controller 142. The standby position sensor 144 is for detecting the position at the time when the slide bar 78 of the slide unit 66 moves to and stands-by at the upper portion side of the slope 42. When the slide bar 78 moves downward, there are cases in which the guide rollers 102 of the receiving guides 94 abut the stop plates 108, and the hooks 100 are pulled-in from above the slope 42. The lower end position sensor 146 is for detecting the position of the slide bar 78 in such cases.

Further, the original position sensor 148 is for detecting the original position at which the reversal unit 68 is accommodated within the supporting frame 36. The reversal position sensor 150 is for detecting a position set such that the reversal unit 68 is tilted the most toward the stock portion 22 side. On the basis of the states detected by these sensors, the controller 142 controls the operation of the raising/lowering motor 86 and the swing motor 118.

A plate detecting sensor 152 and an input switch 154 are connected to the controller 142. As shown in FIGS. 8 and 9, the plate detecting sensor 152 is provided at the head portion 50, and detects the leading end of the printing plate 12 discharged from the discharge opening 16 of the automatic developer 14.

At the stocker 10, the head portion 50 is provided at the top end of the slope 42, regardless of the absence/presence and the number of the intermediate guide members 54. Due to this structure, the plate detecting sensor 152 can reliably detect the leading end of the printing plate 12 which is fed out from the automatic developer 14.

Due to the controller 142 operating the raising/lowering motor 86 at a timing based on the results of detection by the plate detecting sensor 152, the leading end of the printing plate 12 is reliably supported and moved downwardly by the hooks 100.

On the other hand, the input switch 154 is set to, for example, the number of intermediate guide members 54 disposed between the supporting frame 36 and the head portion 50. In this way, the controller 142 sets the timing at which the leading end portion of the printing plate 12 detected by the plate detecting sensor 152 reaches the hooks 100, and operates the raising/lowering motor 86 on the basis of this timing.

Hereinafter, the processing of stacking the printing plate 12 by using the stocker 10 will be described as the operation of the present embodiment with reference to FIGS. 7A and 7B.

This flowchart is executed due to an unillustrated power switch being turned on, and is ended due to the power being cut. In the first step 200, the setting of the input switch 154 is read, and initial setting is carried out. The number of the intermediate guide members 54 provided between the supporting frame 36 and the head portion 50 is set at the input switch 154. Due to the controller 142 reading the set number of the intermediate guide members 54, the controller 142 sets an interval Ts which is the time until the leading end of the printing plate 12 detected by the plate detecting sensor 152 reaches the hooks 100 which are standing-by at the standby position.

At the stocker 10, the number of the intermediate guide members 54 which are mounted to the supporting frame 36 can be set arbitrarily. The distance from the head portion 50 to the stoppers 44, which is the length of the slope 42, can be adjusted by varying the number of the intermediate guide members 54.

Namely, when the printing plate 12 which is long along the conveying direction is stacked, if the slope 42 is short, the leading end portion of the printing plate 12 juts-out from the slope 42. Further, when stacking the printing plate 12 which is short along the conveying direction, if the slope 42 is too long, there is a waste of space.

A number of the intermediate guide members 54, which number corresponds to the length, along the conveying direction, of the printing plate 12 to be stacked, is provided at the stocker 10. The slope 42 is thereby prevented from being either too short or too long.

When the number of the intermediate guide members 54 is different, a distance X, from the plate detecting sensor 152 of the head portion 50 to the hooks 100, changes. Namely, as shown in FIG. 8, when two intermediate guide members 54 are provided, the distance X is a distance $X_1$. Further, as shown in FIG. 9, the distance X at the time when one intermediate guide member 54 is provided is a distance $X_2$ which is shorter, by a widthwise dimension W of the intermediate guide member 54, than the distance $X_1$ ($X_1 > X_2$, $X_1 = X_2 + W$).

From here, on the basis of the setting of the input switch 154, the controller 142 computes the distance X from the plate detecting sensor 152 to the hooks 100. From these results of computation and the discharging speed of the printing plate 12 from the automatic developer 14, the controller 142 computes the time until the leading end of the printing plate 12 detected by the plate detecting sensor 152 will reach the hooks 100. The controller 142 sets this time as the interval Ts.

On the other hand, in order to correctly stack the printing plate 12 discharged from the automatic developer 14 without damaging the printing plate 12, it is necessary to dispose the top end of the head portion 50 at a fixed position with respect to the discharge opening 16, e.g., to make the heightwise difference between the discharge opening 16 and the distal end of the head portion 50 be 50 mm or less. At this time, when the length of the slope 42 changes, the height of the upper end of the head portion 50 also changes, and the heightwise difference between the discharge opening 16 and the head portion 50 falls outside of the appropriate range.

Thus, at the stocker 10, the position of the bracket 60 with respect to the supporting plate 40 of the slope portion 20 can be adjusted, and the angle of inclination of the slope 42, which is the angle of the supporting frame 36, can be adjusted. Namely, the mounting position of the bracket 60 provided at the supporting frame 36 is adjusted within the elongated hole 62 such that the angle of inclination of the supporting frame 36 can be changed.

Figure 10A:
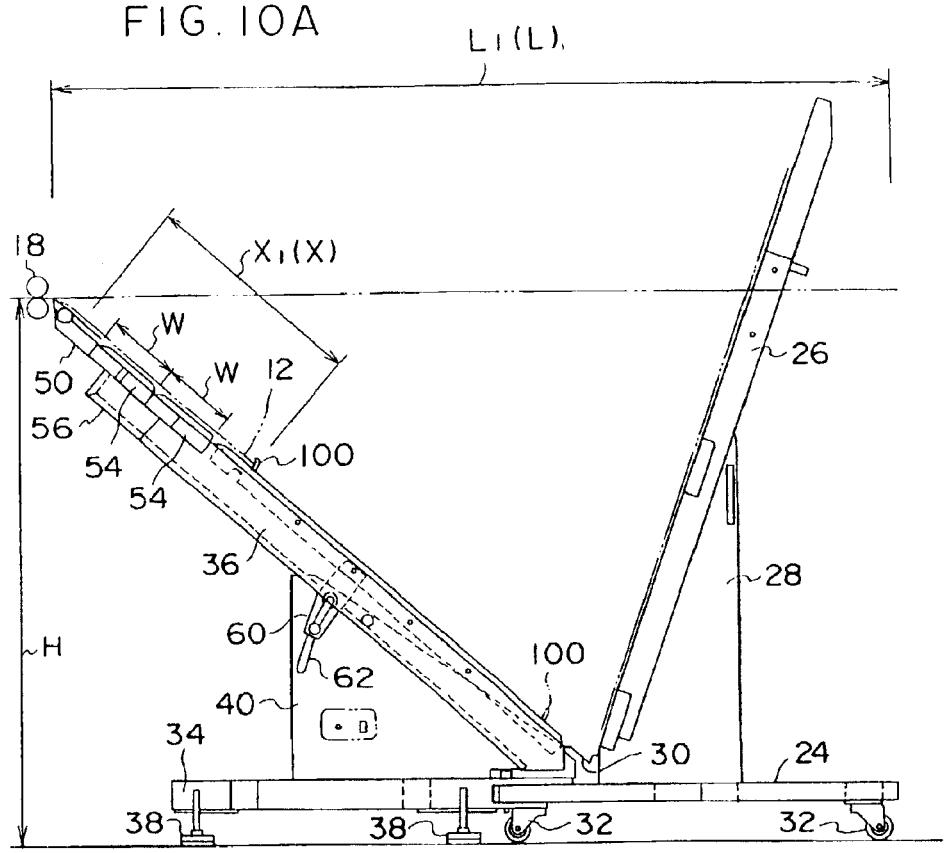
FIG. 10A is a schematic diagram seen from a side surface of the stocker shown in FIG. 8.

In this way, for example, as shown in FIG. 8, in order to stack a printing plate 12 whose length along the conveying direction is long, when two of the intermediate guide members 54 are provided, as shown in FIG. 10A, the bracket 60 is fixed at the lower side of the elongated hole 62. In this way, the top end of the head portion 50 can be disposed at a predetermined height with respect to the discharge opening 16.

Figure 10B:
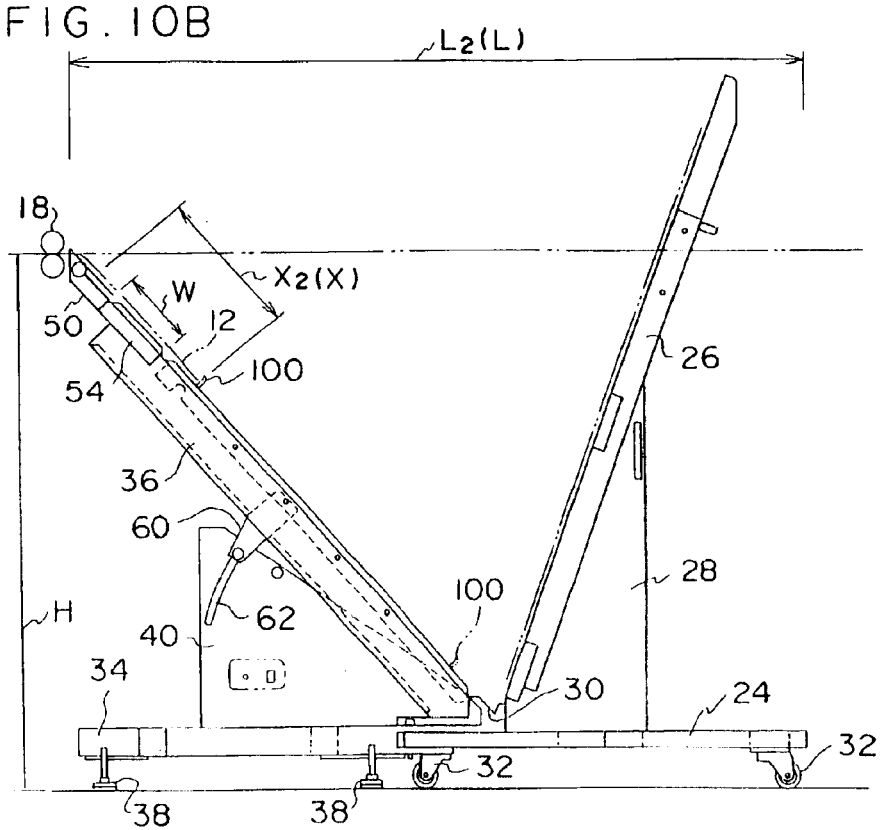
FIG. 10B is a schematic diagram seen from a side surface of the stocker shown in FIG. 9.
Figure 12:
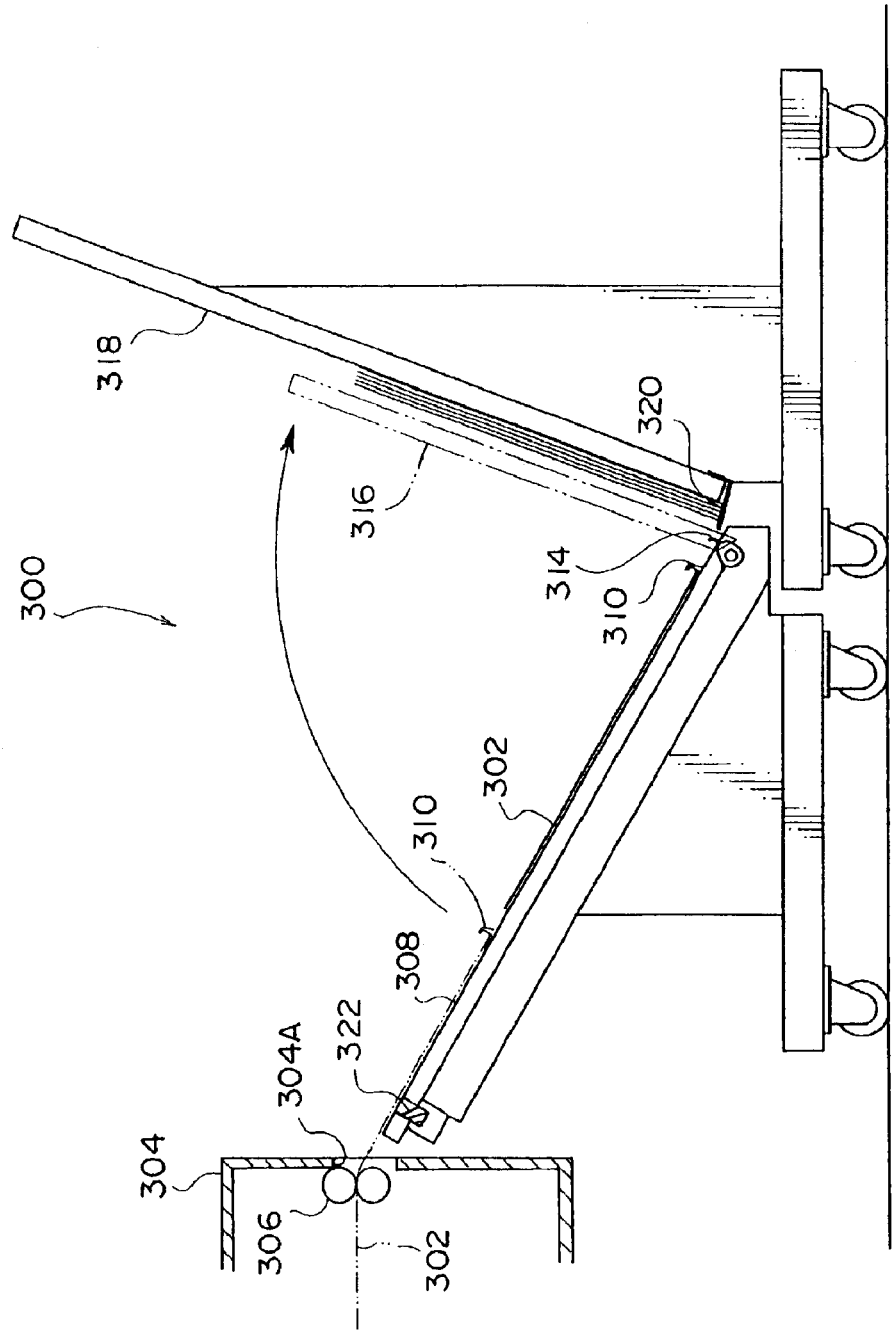
FIG. 12 is a side view of the stocker relating to the other embodiment.

In contrast, as shown in FIG. 9, when the number of the intermediate guide members 54 is reduced (to, for example, one) as shown in FIG. 10B, the fixing position of the bracket 60 is moved to the upper side of the elongated hole 62. In this way, the angle of inclination of the supporting frame 36 becomes large, and even if the length of the slope 42 is short, the height of the head portion 50 can be made to be high. The upper end of the head portion 50 can be set at a predetermined height with respect to the discharge opening 16.

On the other hand, when the angle of inclination of the slope 42 is made to be large, the placement space of the stocker 10 along the conveying direction of the printing plate 12 can be made shorter. Namely, as shown in FIG. 10A, given that a length L, which is the placement space of the stocker 10 along the conveying direction of the printing plate 12, is a length $L_1$ when the slope 42 is long, as shown in FIG. 10B, when the slope 42 is short, the length L is a length $L_2$ which is shorter than the length $L_1$ ($L_1 > L_2$). Thus, space can be conserved even more.

In this way, for example, in order to stack a printing plate 12 whose length along the conveying direction is 1310 mm, as shown in FIGS. 8 and 10A, two intermediate block members 54 are utilized. When a height H to the distal end of the head portion 50 is set to be 926 mm, the length L ($L_1$) is 1478 mm. In contrast, when it suffices to stack a printing plate 12 whose length along the conveying direction is about 940 mm, as shown in FIGS. 9 and 10B, it suffices to utilize one intermediate guide member 54, and the length L ($L_2$) is thereby kept down to 1295 mm.

Namely, as shown in FIGS. 10A and 10B, without changing the height H from the floor surface to the distal end of the head portion 50, the length of the slope 42 is made to correspond to the length of the printing plate 12, and large-sized printing plates 12 can be stacked. Further, when small-sized printing plates 12 are stacked, space can be conserved.

In the present embodiment, the length of the slope 42 is changed by using the intermediate guide members 54, whose widthwise dimension W, which is the length along the conveying direction of the printing plate 12, is constant. However, the present invention is not limited to the same, and intermediate guide members having different lengths may be used. Any arbitrary method may be used as the method for attaching the intermediate guide members. Further, the intermediate guide members are not limited to replaceable or attachable/removable type members, and may be extendible/contractible type members.

Figure 7A:
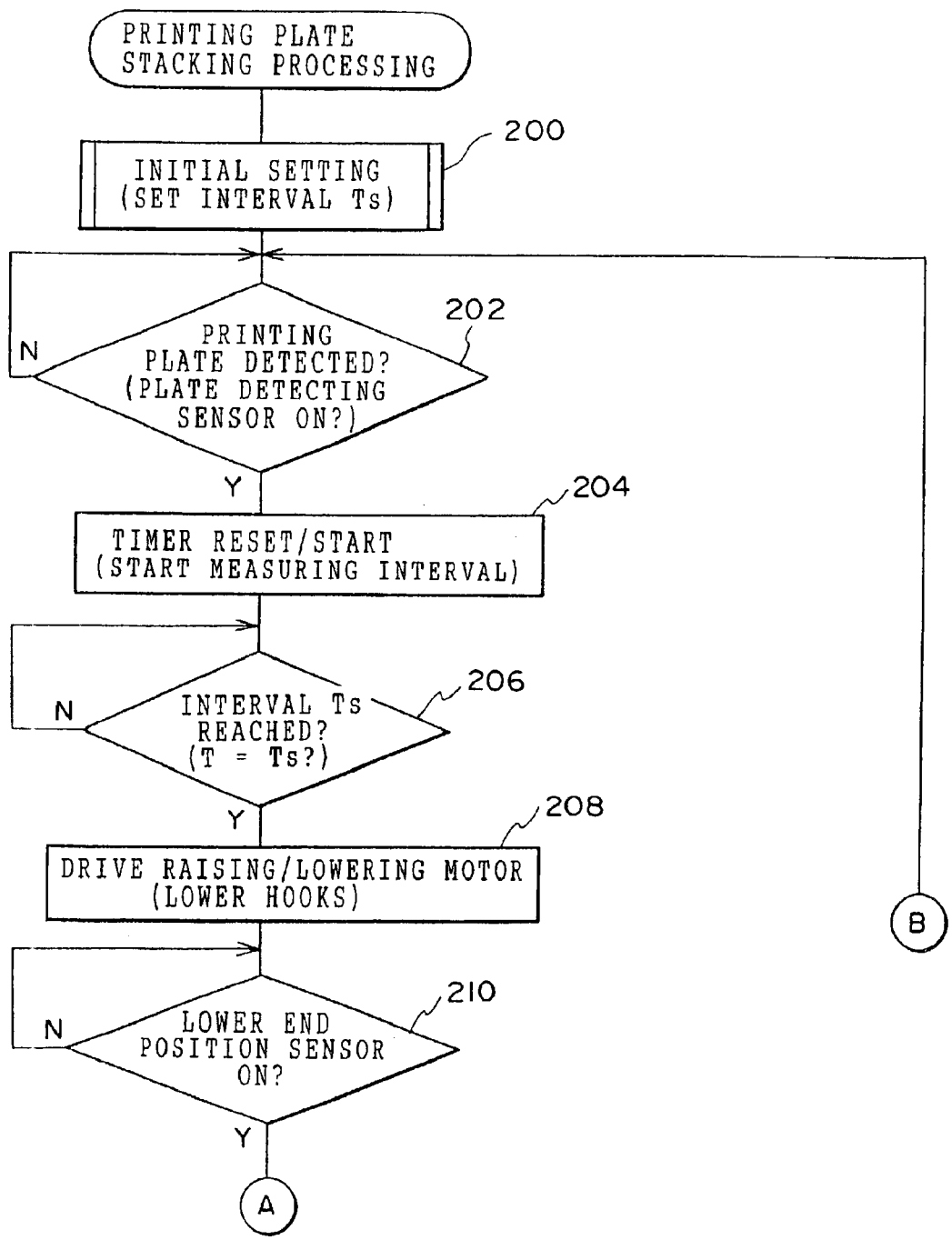
FIGS. 7A and 7B are flowcharts showing an outline of processing for stacking a printing plate.
Figure 7B:
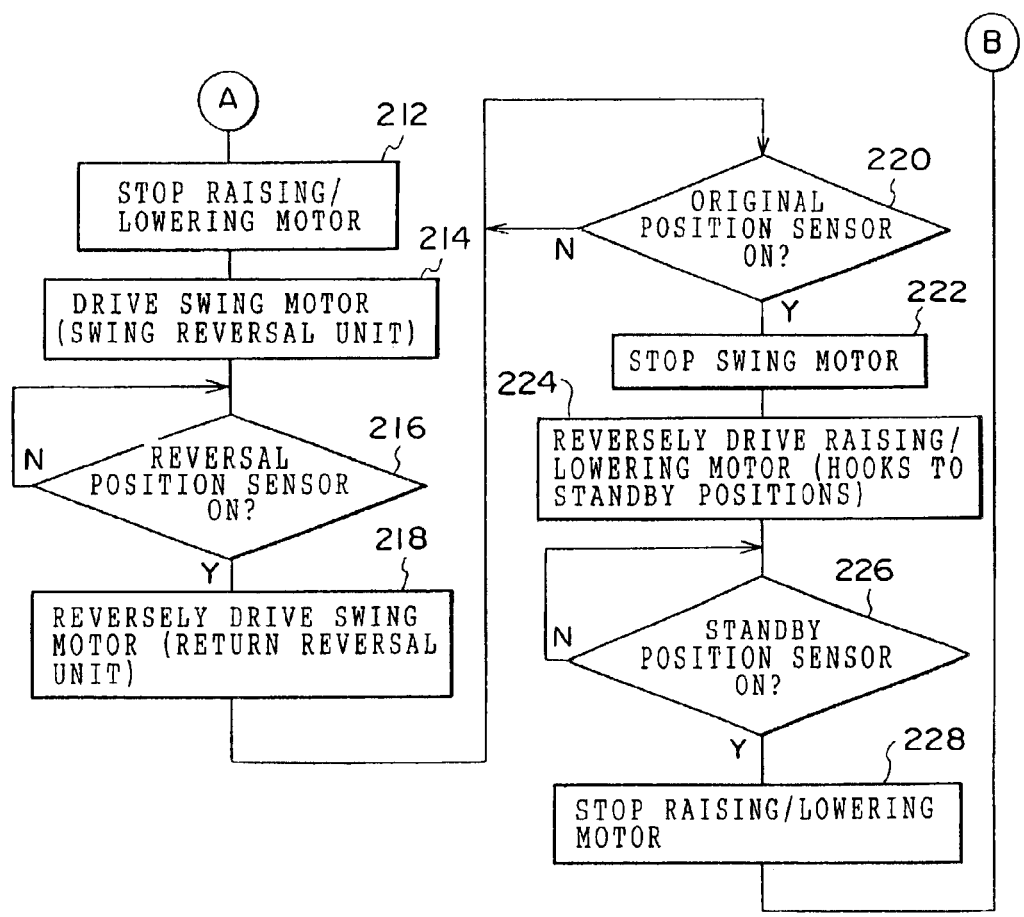

In the flowchart of FIG. 7A, when the setting of the interval Ts is completed, stacking processing of the printing plate 12 is possible.

In the stacking processing of the printing plate 12, first, in step 202, it is confirmed whether or not the plate detecting sensor 152 has detected the leading end of the printing plate 12. At this time, at the stocker 10, the hooks 100 are moved to their standby positions, and the reversal unit 68 is moved to its original position within the supporting frame 36.

Here, when the printing plate 12, which has been processed at the automatic developer 14, is fed out from the discharge opening 16 by the discharge roller pair 18, the leading end of that printing plate 12 passes above the plate detecting sensor 152 and is detected by the plate detecting sensor 152. In this way, the determination in step 202 is affirmative, and the routine moves on to step 204.

In step 204, an unillustrated timer is reset and started, and counting of the interval Ts is started. Namely, measuring of the time until the leading end of the printing plate 12 fed out from the discharge opening 16 will reach a predetermined distance (e.g., about 30 mm) from the hooks 100 is started.

In the next step 206, it is confirmed whether the counted time T has reached the interval Ts. When the counted time T has reached the interval Ts (T=Ts), the determination in step 206 is affirmative, and the routine moves on to step 208 where driving of the raising/lowering motor 86 starts such that the hooks 100 are lowered. Further, in step 210, it is confirmed whether or not the lower end position sensor 146 has operated. Namely, it is detected whether the slide bar 78, at which the hooks 100 are provided, has been lowered to a predetermined position. Further, in step 212, the raising/lowering motor 86 is stopped due to the lower end position sensor 146 being in an operating state and the determination in step 210 being affirmative.

In this way, at the time when the leading end of the printing plate 12 reaches a predetermined distance from the hooks 100, the hooks 100 are moved downward at a moving speed which is slightly slower than the conveying speed (feed-out speed) of the printing plate 12 at the automatic developer 14 (e.g., the moving speed is about 3% slower than the feed-out speed). The leading end of the printing plate 12 which is fed-out from the automatic developer 14 abuts and is supported by the hooks 100 which are in the midst of moving. The printing plate 12 moves down the slope 42 in a state of being supported by the hooks 100.

At the slide unit 66, when the slide bar 78 is lowered due to the driving of the raising/lowering motor 86, the hooks 100 are lowered toward the stoppers 44 provided at the reversal unit 68. At this time, the stop plates 108 are provided at the slide unit 66. When the hooks 100 approach the stoppers 44 and the guide rollers 102 abut the top plates 108, the swing arms 96 at which the hooks 100 are provided rotate.

In this way, the hooks 100 are pulled in from above the slope 42, the supporting of the leading end of the printing plate 12 is cancelled, the leading end of the printing plate 12 abuts the stoppers 44, and the lowering of the printing plate 12 is stopped. Accompanying this operation, the lower end position sensor 146 is operated, the determination in step 210 is affirmative, and the routine moves on to step 212. Then, the driving of the raising/lowering motor 86 is stopped, and the printing plate 12 is loaded on the reversal unit 68.

Thereafter, in step 214, the swing motor 118 is driven. In step 216, it is confirmed whether or not the reversal position sensor 150 has operated.

Due to the raising/lowering motor 118 being driven, the reversal unit 68 rotates from the interior of the supporting frame 36 toward the back plate 26 of the stock portion 22. In this way, in a state in which the lower end portion of the printing plate 12 is supported by the stoppers 44, the printing plate 12 is carried up by the reversal unit 68 and is pivoted toward the stock portion 22.

Further, when the reversal unit 68 swings toward the stock portion 22, the stoppers 44, which are supporting the lower end of the printing plate 12, rotate around the shaft 114 integrally with the reversal unit 68. The stoppers 44 thereby pass through the cut-outs 134 formed in the receiving plate 30 of the stock portion 22, and move to beneath the receiving plate 30.

In this way, the lower end of the printing plate 12, which is supported by the stoppers 44, is transferred to and supported by the receiving plate 30. Further, the printing plate 12, which is carried up by the reversal unit 68, is pivoted toward the back plate 26 of the stock portion 22, and is thereby stacked in a state of leaning up against the back plate 26. At this time, due to the reversal unit 68 being rotated to a predetermined position and the reversal position sensor 150 being operated, the determination in step 216 is affirmative, and the routine moves on to step 218 where the swing motor 118 is driven to rotate reversely.

In this way, the reversal unit 68, which has transferred the printing plate 12 over to the stock portion 22, begins to swing toward the supporting frame 36.

Further, in step 220, it is confirmed whether or not the original position sensor 148 has been operated. When the reversal unit 68 is accommodated within the supporting frame 36 and the original position sensor 148 is operated, the determination in step 220 is affirmative. The routine moves on to step 222, and the swing motor 118 is stopped.

In this way, when the transfer of the printing plate 12 to the stock portion 22 has been completed, in step 224, the raising/lowering motor 86 is driven to rotate reversely, the slide bar 78 is moved upward, and the hooks 100 are returned to their standby positions. At this time, due to the guide rollers 102 of the swing arms 96, at which the hooks 100 are provided, moving away from the stop plates 108, the hooks 100 project above the slope 42, and the standby position sensor 144 is operated. The determination in step 226 is thereby affirmative, and the routine moves on to step 228 where the raising/lowering motor 86 is stopped, and the stocker 10 stands-by until the next printing plate 12 is discharged.

In this way, at the stocker 10, when the printing plate 12, which has been moved downward on the slope 42, is tilted over toward the stock portion 22 in the state in which the printing plate 12 is received and supported by the stoppers 44 provided at the lower end of the slope 42, the printing plate 12 is transferred from the stoppers 44 to the receiving plate 30 of the stock portion 22. Thus, no damage or the like is caused to the leading end of the printing plate 12 at the time when the printing plate 12 moves down the slope 42.

Namely, an impact which is not small is applied to the leading end of the printing plate 12 when the downward movement of the printing plate 12 stops, in a case in which the printing plate 12, which is moving down the slope 42, is stopped due to the leading end of the printing plate 12 abutting the receiving plate 30 of the stock portion 22, and also in a case in which the leading end of the printing plate abuts the receiving plate 30 of the stock portion 22 when the hooks, which move downward while supporting the printing plate, reverse. Thus, there is the concern that the leading end of the printing plate 12 may be damaged due to this impact.

In contrast, at the stocker 10, the printing plate 12 is transferred to the stoppers 44 provided at the bottom end portion of the slope 42, from the hooks 100 which move downward on the slope 42. Thus, when the printing plate 12 stops, no impact is applied to the leading end of the printing plate 12.

Further, at the stocker 10, when the printing plate 12 is reversed toward the back plate 26 of the stock portion 22, the stoppers 44, which are supporting the leading end (bottom end) of the printing plate 12 are rotated integrally, and transfer the bottom end of the printing plate 12 to the receiving plate 30. Thus, even when the printing plate 12 is transferred to the stock portion 22, no impact is applied to the bottom end of the printing plate 12.

On the other hand, when an attempt is made to reverse the printing plate 12 in a state in which the leading end of the printing plate 12 is loaded in advance on the receiving plate 30 of the stock portion 22, the lower end portion of the printing plate 12 is bent, and there is the concern that damage, such as breaking or bending or the like of the lower end portion of the printing plate 12, may occur.

In contrast, at the stocker 10, the stoppers 44 are provided at the bottom end portion of the reversal unit 68. The stoppers 44 rotate integrally with the printing plate 12 in the state in which the bottom end of the printing plate 12 is supported by the stoppers 44. Thus, the lower end portion of the printing plate 12 is not bent when the printing plate 12 is reversed.

Accordingly, the printing plates 12 discharged from the automatic developer 14 can be leaned up against and stacked at the back plate 26 of the stock portion 22 in order, without any damage, such as breakage or bending or the like, being caused to the bottom ends of the printing plates 12.

It is to be noted that the above-described embodiment is not intended to limit the structure of the present invention. For example, in the present embodiment, the stocker 10, which can be divided into the slope portion 20 and the stock portion 22, is described as an example. However, the present invention may be a printing plate stacking device in which the slope portion 20 and the stock portion 22 are integral. In this case, it suffices to form the base 24 and the base 34 integrally.

A stacking device (hereinafter called a "stocker") 300 relating to another embodiment is illustrated in FIGS. 11 through 14. The stocker 300 is provided so as to correspond to a discharge opening 304A of a processor 304 which processes sheet members 302. The sheet members 302 encompass photosensitive lithographic printing plates, and hereinafter are called printing plates 302 for simplicity.

Because the stocker 300 is used for various purposes, the processor 304 cannot be specified. However, examples of the processor 304 are automatic developers, after-exposure devices, and the like. In any case, a pair of conveying rollers 306 are provided at the discharge opening 304A. The printing plate 302 is discharged while being nipped by the conveying rollers 306.

The stocker 300 forms a substantial V-shape as seen in side view. At the stocker 300, a pair of inclined surfaces oppose one another. The one inclined surface, which is nearer to the processor 304, is a slope 308, and is a guide surface along which the printing plate 302 discharged from the discharge opening 304A slides down. Hooks 310, which are for supporting the conveying direction leading end portion of the printing plate 302 discharged from the discharge opening 304A, project from the surface of the slope 308.

The hooks 310 are formed from resin, rubber, or metal. The hooks 310 are preferably formed from resin or rubber in order to mitigate the impact to the printing plate 302 which is sliding down.

Slits (not shown) are formed in the slope 308 along the loci of movement of the hooks 310. The hooks 310 can move up and down on the slope 308 along the slits due to the driving force of an unillustrated drive device. In this case, the positions of the hooks 310, which positions are near the top of the slope 308, are their reference positions. The hooks 310 receive and stop the conveying direction leading end portion of the printing plate 302 discharged from the discharge opening 304A, and thereafter, move down the slope 308 at a speed corresponding to the discharging linear speed of the printing plate 302. Namely, the hooks 310 function to mitigate the impact to the printing plate 302 at the time when the printing plate 302 is completely discharged and freely falls down from the discharge opening 304A.

Further, at the bottommost position of the slope 308, the hooks 310 are pulled-in downward from the surface of the slope 308, and transfer the printing plate 302 to stoppers 314 formed at the slope 308.

A rotating plate 316 is superposed on the slope 308. The rotating plate 316 can rotate around the lower end portion of the stocker 300 (the angle portion of the substantial V shape). Due to this rotation, the printing plate 302 leaning against the slope 308 is pushed, and is transferred over to a stacking wall 318 which is the other inclined surface. In this case, the stoppers 314 and supporting plates 320 at the stacking wall 318 are respectively formed in comb shapes so as to cross one another. When the rotating plate 316 rotates, the stoppers 314 move from above to beneath the supporting plates 320 of the stacking wall 318, and can transfer the printing plate 302.

A printing plate detecting sensor 322 is provided at the top end of the slope 308. The printing plate detecting sensor 322 is a refection-type photoelectric converting sensor equipped with a light-projecting portion and a light-receiving portion (both unillustrated). The printing plate detecting sensor 322 outputs different signals when an object to be detected opposes or does not oppose the printing plate detecting sensor 322. Namely, when the printing plate 302, which has been discharged from the discharge opening 304A, is detected, the printing plate detecting sensor 322 outputs an operation signal, i.e., a high-level signal. When no printing plate 302 is detected, the printing plate detecting sensor 322 outputs a non-operation signal, i.e., a low-level signal. In other words, when the leading end portion of the printing plate 302 reaches the region above the printing plate detecting sensor 322, the signal switches from non-operation to operation. When the trailing end portion of the printing plate 302 passes by the printing plate detecting sensor 322, the signal switches from operation to non-operation.

The movement of the hooks 310 and the rotation operation of the rotating plate 316 are controlled with the detection of the leading end of the printing plate 302 by the printing plate detecting sensor 322 being a trigger for operation. Namely, when the leading end of the printing plate 302 is detected by the printing plate detecting sensor 322, the time until the conveying direction leading end portion of the printing plate 302 reaches the hooks 310 can be computed on the basis of the distance from the printing plate detecting sensor 322 to the hooks 310 and the conveying linear speed of the printing plate 302. The hooks 310 can be operated at the optimal time. Further, the conveying plate 316 is operated on the basis of the operation time of the hooks 310.

The printing plate detecting sensor 322 is provided so as to face upward at the slope 308. Thus, when an operator places his/her hand in the detecting range of the printing plate detecting sensor 322, the signal may switch from non-operation to operation. Further, also in a case in which a part or the like which is being held by the operator passes through the detecting range, there is the possibility that the signal may switch from non-operation to operation to non-operation. Further, there are cases in which non-operation and operation repeat.

When, even though there is, as described above, false detection in which the distal end portion of the printing plate 302 is not detected, and this is mistakenly determined to be the leading end portion of the printing plate 302, and operation of the hooks 310 and the rotating plate 316 is started, unforeseen problems arise, and the processings thereafter for the printing plate 302 are delayed until all members are returned to their initial reference positions.

Thus, in the present embodiment, the detection state (non-operation time, operation time) of the printing plate detecting sensor 322 is recognized in detail, and the authenticity of the printing plate detection is judged by whether or not operation and non-operation are repeated under predetermined conditions.

This judgement is carried out by a combined condition of respective duration times (i, ii, iii, iv . . . ) of the repetitions of operation/non-operation (i.e., non-operation) of a number of times since the trailing end portion of the printing plate 302 discharged from the previous process has passed by the printing plate detecting sensor 322.

Basically, the first condition is non-detection, for 4 seconds or more, of the printing plate 302 by the printing plate detecting sensor 322. The second condition is detection, for 2 seconds or more, of the printing plate 302 by the printing plate detecting sensor 322. When the second condition is established following the establishment of the first condition, it is judged that the detection of the leading end portion of the printing plate 302 is authentic (correct), and operation of the hooks 310 and the like is triggered.

Further, a third condition, which is non-detection, for less than 4 seconds, of the printing plate 302 by the printing plate detecting sensor 322, is added. When the second condition is established following the establishment of the third condition, the detection of the leading end portion of the printing plate 302 is judged to be false, and error processing is carried out.

Tables 1 and 2 summarize the results of judgement based on the above conditions. Table 1 shows a case in which the initial interval is 4 seconds or more, and Table 2 shows a case when the initial interval is less than 4 seconds.

Further, "operate" in Tables 1 and 2 means that, with the printing plate detecting sensor 322 in an operating state, it is judged that the printing plate 302 has been detected (a judgement that detection is authentic), and the operation of the hooks 310 and the like is carried out. Further, "do not operate" in Tables 1 and 2 means that, with the printing plate detector 322 in an operating state, it is judged that the printing plate 302 has not been detected (a judgement that detection is false), and that this detection is cancelled without the hooks 310 and the like being operated.

Further, "error" in Tables 1 and 2 means that it is judged that some type of trouble has occurred at the stocker 300, and a predetermined error processing is executed.

Note that in a case in which the operational state is judged to be "do not operate" in condition iv and on, processing returns to condition i, and judgement is carried out repeatedly.

TABLE 1

Table for Judging Authenticity of Detection of PS Plate Detecting Sensor (Part 1)

| condition | pattern A | pattern B | pattern C | pattern D | pattern E |
|---|---|---|---|---|---|
| i | | | 4 or more sec | | |
| ii | 2 or more sec | | | less than 2 sec | |
| iii | — | | 4 or more sec | | less than 4 sec |
| iv | — | 2 or more sec | less than 2 sec | 2 or more sec | less than 2 sec |
| operation | operate | operate | do not operate | operate | do not operate |

TABLE 2

Table for Judging Authenticity of Detection of PS Plate Detecting Sensor (Part 2)

| condition | pattern F | pattern G | pattern H | pattern I | pattern J |
|---|---|---|---|---|---|
| i | | | less than 4 sec | | |
| ii | 2 or more sec | | | less than 2 sec | |
| iii | — | | 4 or more sec | | less than 4 sec |
| iv | — | 2 or more sec | less than 2 sec | 2 or more sec | less than 2 sec |
| operation | error | operate | do not operate | error/ operate | do not operate |

Operation of another embodiment will be described hereinafter.

The printing plate 302, for which processing at the processor 304 has been completed, is discharged while being nipped by the pair of conveying rollers 306 provided at the discharge opening 304A of the processor 304.

Figure 13A:
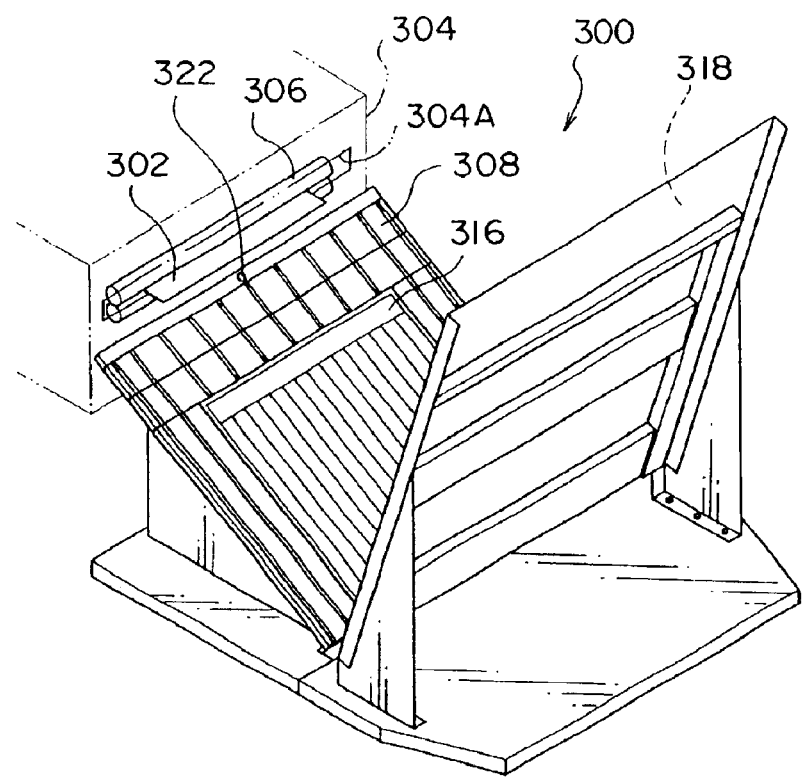
FIG. 13A is a perspective view of the stocker relating to the other embodiment and the periphery thereof, and shows a state in which discharging of the printing plate from a processing device has started.
Figure 13B:
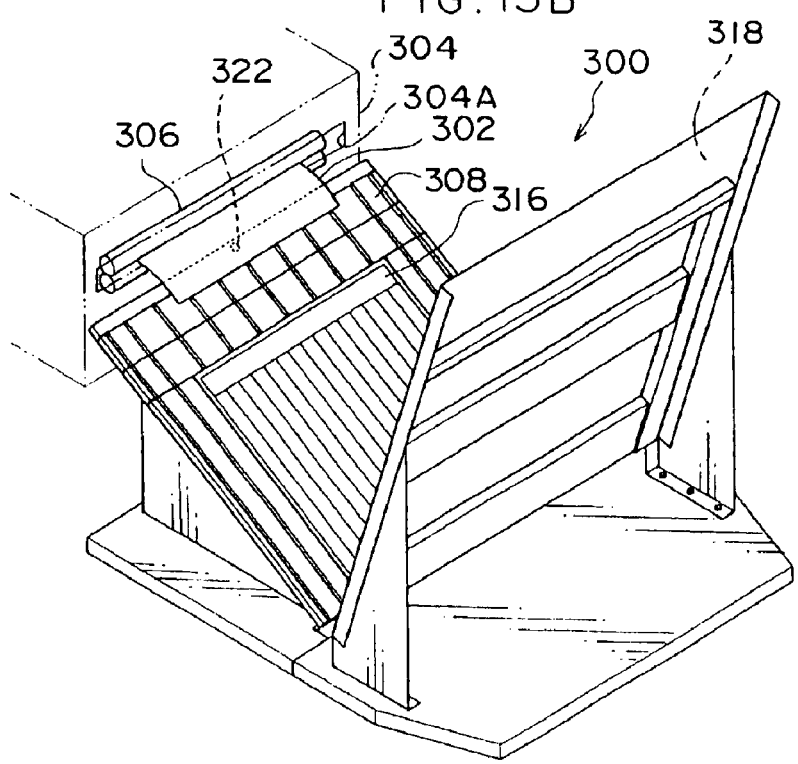
FIG. 13B is a perspective view of the stocker relating to the other embodiment and the periphery thereof, and shows a state in which a distal end portion of the discharged printing plate hangs down along a slope.

The portion of the printing plate 302 which has been discharged is, immediately after discharge, in a substantially horizontal state (see FIG. 13A). However, as the printing plate 302 continues to be discharged, it hangs down from the leading end portion thereof due to its own weight (see FIG. 13B), and moves along the slope 308 of the stocker 300.

The printing plate detecting sensor 322 is provided at the upper end portion of the slope 308 of the stocker 300. The leading end portion of the printing plate 302 is detected by the printing plate detecting sensor 322. After a predetermined time from the point in time when the leading end portion of the printing plate 302 is detected, the hooks 310 start to descend along the slope 308 from their reference positions. The speed of this descent substantially coincides with the conveying linear speed of the printing plate 302 which is discharged out from the processor 304 and conveyed.

Here, the predetermined time at which the movement of the hooks 310 starts from the detection of the leading end portion of the printing plate 302 by the printing plate detecting sensor 322, is the point in time when the leading end portion of the printing plate 302 is supported by the hooks 310, or immediately before the leading end portion is supported. Thus, when the trailing end portion of the printing plate 302 is released from the nip of the conveying rollers 306, the leading end portion of the printing plate 302 is received and stopped by the hooks 310, either in a state in which the printing plate 302 is not yet sliding down or in a low-speed state at the start of sliding down. Thus, the impact applied to the printing plate 302 is mitigated.

Figure 14A:
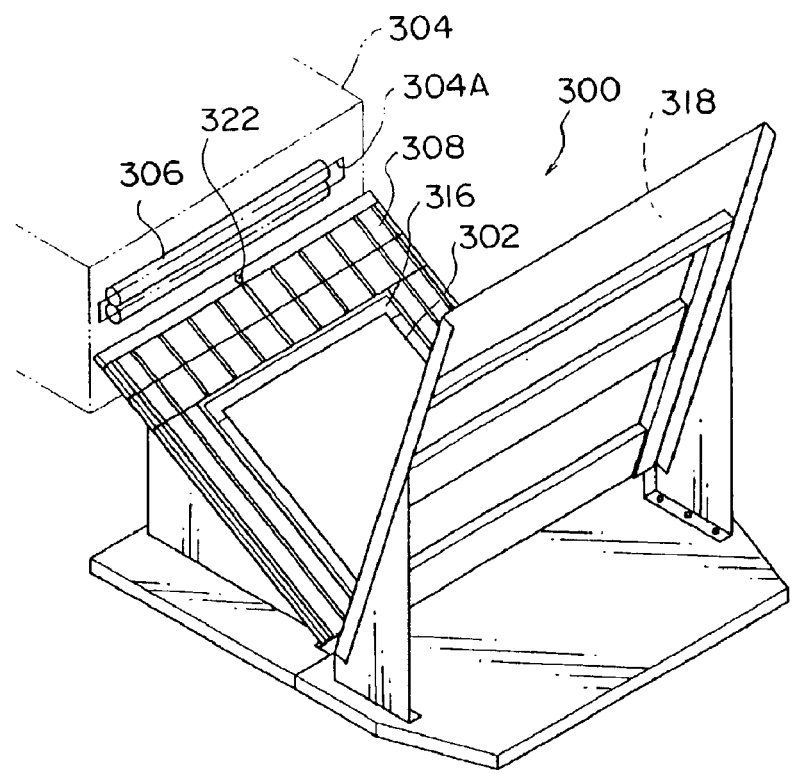
FIG. 14A is a perspective view of the stocker relating to the other embodiment and the periphery thereof, and shows a state in which the printing plate is supported at the slope of the stocker.
Figure 14B:
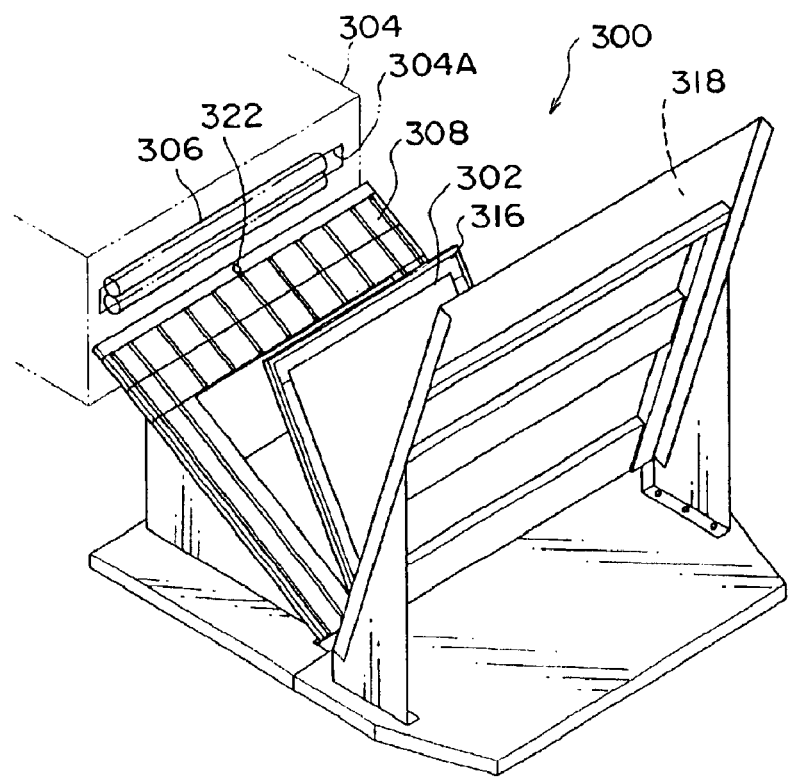
FIG. 14B is a perspective view of the stocker relating to the other embodiment and the periphery thereof, and shows a state in which the printing plate is moved toward a stacking wall by a rotating plate.

Thereafter, the hooks 310, which are attached to a belt which moves along the direction from the top to the bottom of the slope 308 and the direction opposite thereto, move downward along the slope 308 while supporting the printing plate 302, and reach the lower end portion of the slope 308 (see FIG. 14A).

Due to the hooks 310 being pulled-in from the surface of the slope 308 to the underside thereof, the printing plate 302 is transferred from the hooks 310 to the stoppers 314. At this point in time, the rotation of the rotating plate 316 starts. In this way, the printing plate 302 is moved while being rotated around the lower end portion thereof toward the stacking wall 318, so as to be pushed from the slope 308 surface (see FIG. 14B).

When the rotating plate 316 rotates toward the stacking wall 318, the comb-type stoppers 314 move from the upper side to the lower side of the comb-type supporting plates 320 at the stacking wall 318 so as to cross the supporting plates 320. At this time, the lower end portion of the printing plate 302 is transferred to the supporting plate 320, and the printing plate 302 is stacked so as to lay against the stacking wall 318.

By repeating these operations, the printing plates 302 discharged from the processor 304 are superposed and stacked so as to lean up against the stacking wall 318.

A sensor detecting state authenticity judging program which judges the authenticity of an operation state, which is a state in which the printing plate 302 is detected by the printing plate detection sensor 322 and which is a trigger for movement of the hooks 310 and movement of the rotation plate 316, is incorporated into another embodiment. This is to prevent the stocker 300 from improper functioning when an operator happens to insert the next printing plate 302 without the predetermined interval. Additionally, it is to prevent the printing plate detecting sensor 322 from operating and a mistaken judgement that the printing plate 302 has passed over the printing plate detecting sensor 322, due to the hand of the operator or a part or the like held by the operator passing through the detection region of the printing plate detecting sensor 322.

Hereinafter, the sensor detecting state authenticity judging routine will be described in accordance with the flowchart of FIGS. 16A and 16B.

First, in step 400, variable I, variable J, and variable K are cleared (set to 0), and the routine moves on to step 402. Note that the variable I gradually increases when the non-operation time period ($t_{off}$) is 4 seconds or more, the variable J gradually increases when the non-operation time period ($t_{off}$) is less than 4 seconds, and the variable K gradually increases when the operation time period ($t_{on}$) is less than two seconds.

In the next step 402, a determination is made as to whether the non-operation time period ($t_{off}$) of the printing plate detecting sensor 322 has become 4 or more seconds. If the determination is affirmative, the routine moves on to step 404 where the variable I is incremented. If the determination is negative, the routine moves on to step 406 where the variable J is incremented. Both after step 404 and after step 406, the routine moves on to step 408.

In step 408, a determination is made as to whether the operation time period ($t_{on}$), from the point in time when the state became the operating state from the non-operating state, is 2 or more seconds.

If the determination in step 408 is negative, the routine moves on to step 410 where the variable K is incremented, and in following step 412, a determination is made as to whether the variable K has become 2. If the determination in step 412 is negative, the routine returns to step 402, and the next non-operation time period ($t_{off}$) is judged. Further, if the determination in step 412 is affirmative, it is judged that the operation of the printing plate detecting sensor 322 is not the detection of the leading end of the printing plate 302. This operating state is cancelled, and the routine ends.

If the determination in step 408 is affirmative, the routine moves to step 414 where it is judged whether the variable I is greater than 0, i.e., is 1 or more. This is a determination as to whether or not the non-operation time period ($t_{off}$) has been 4 seconds or more even one time. If the determination in step 414 is negative, the routine moves to step 416 where it is judged whether or not the variable K is 0. If the determination is affirmative in step 416, it is judged that some type of error has arisen. The routine moves on to step 418 where error processing is carried out, and the routine ends. Further, if the determination in step 416 is negative, the routine moves on to step 420.

Further, if the determination in step 414 is affirmative, the routine moves on to step 420 where it is judged whether or not the variable J is 2. This is a judgement as to whether or not a non-operation time period ($t_{off}$) of less than 4 seconds has existed twice. If the determination in step 420 is negative, it is judged the conditions have been established. The routine moves on to step 422 where permission carry out the operations of the next process is given, and the routine ends.

Moreover, if the determination in step 420 is affirmative, the routine moves on to step 424 where it is judged whether the total time period ($t_{total}$) of the non-operation, operation, non-operation which have been repeated until there is finally operation is 4 seconds or more. The authenticity is judged on the basis of these results. Namely, it is judged whether the total time period ($t_{total}$) is 4 seconds or more, and if the judgement is affirmative, it is determined that the detection of the printing plate 302 is authentic (true). The routine moves on to step 422, and permission to carry out the operations of the next process is given. Further, if the determination in step 424 is negative, it is judged that the detection of the printing plate 302 is false. The routine moves on to step 418, and error processing is carried out.

Figure 16A:
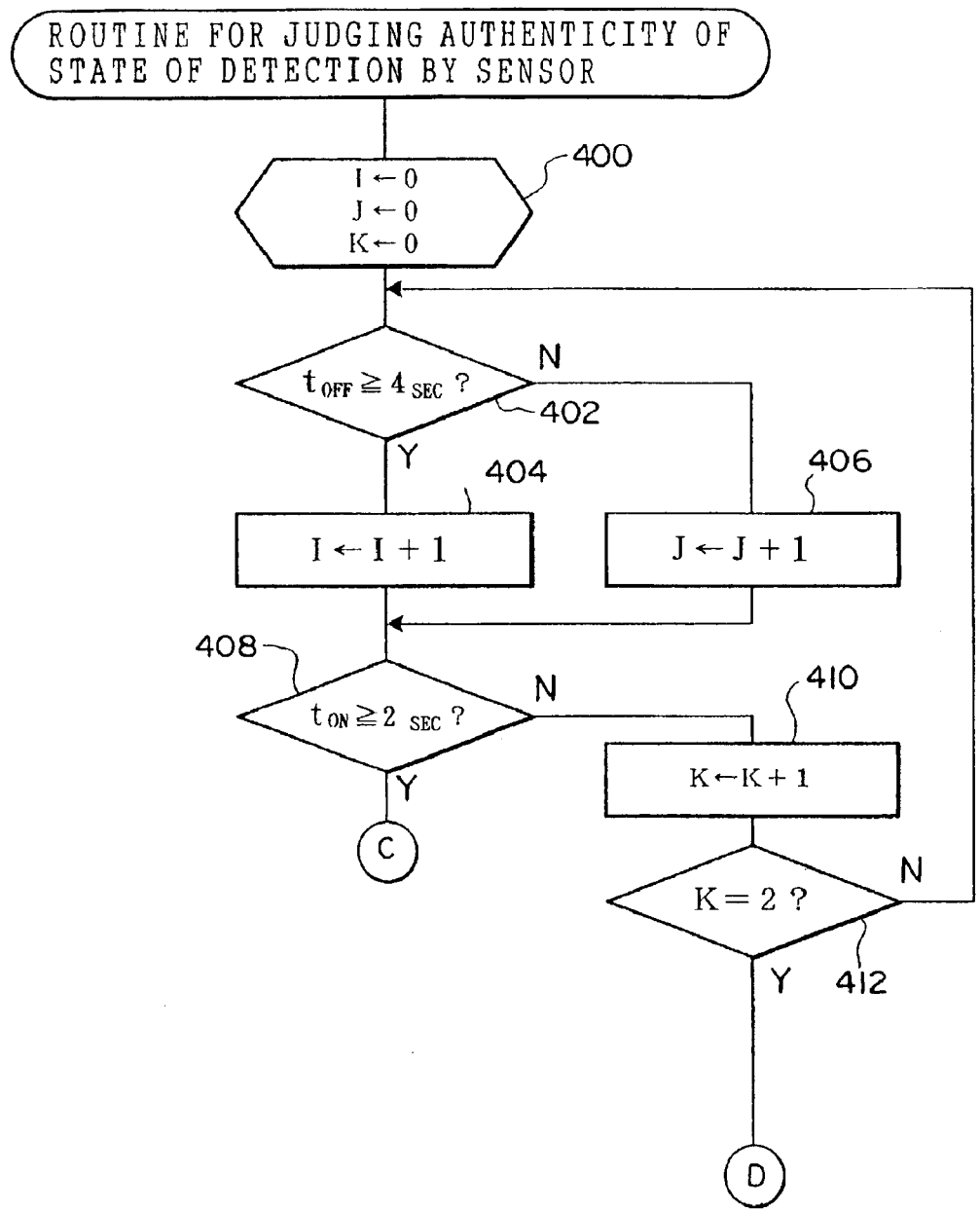
FIGS. 16A and 16B are control flowcharts showing a sensor detecting state authenticity judging routine relating to yet another embodiment.
Figure 16B:
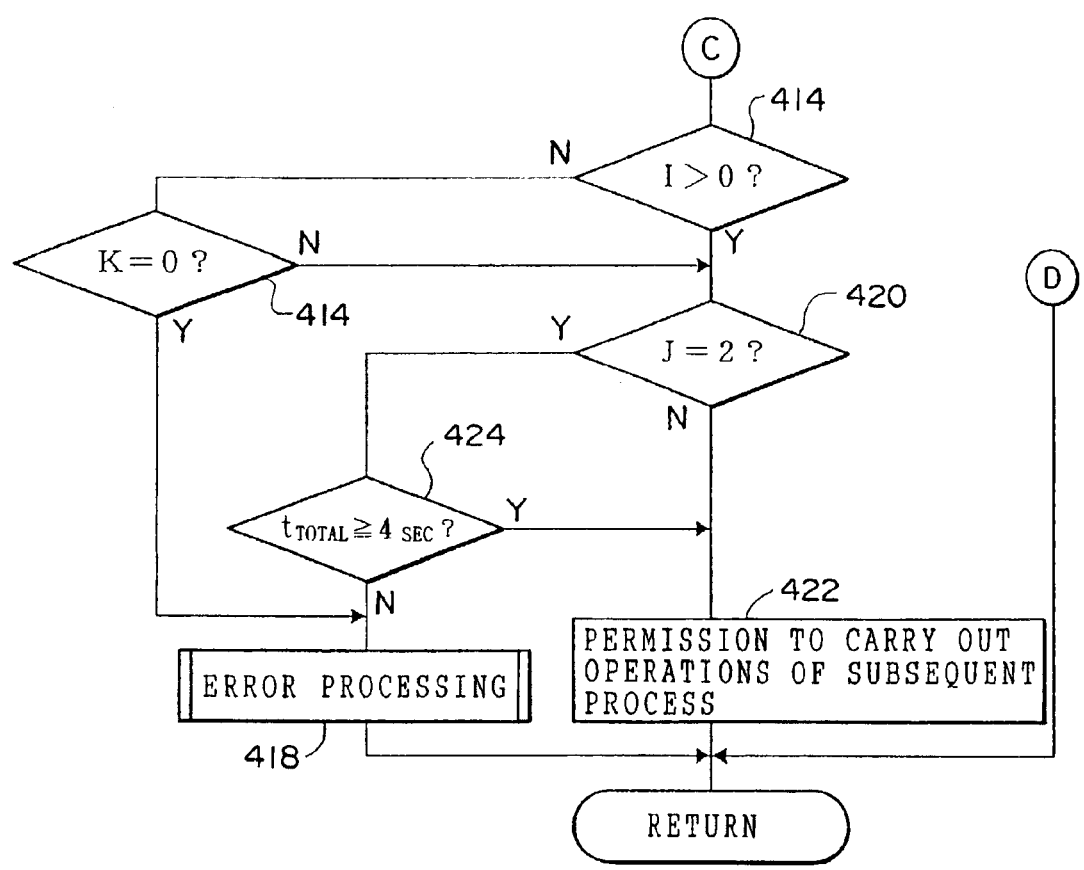

FIGS. 17A through 19B are schematic diagrams to which only the step numbers of the flowchart of FIGS. 16A and 16B have been added. FIGS. 17A through 19B show, by thick-lined arrows, the flow of processing at the operation/non-operation time periods of condition i through iv of the respective patterns shown in Tables 1 and 2.

In pattern A of Table 1, when condition i is 4 seconds or more and condition ii is 2 seconds or more, the flow of processing is as per the thick-lined arrow in FIG. 7A.

In pattern B of Table 1, when condition i is 4 seconds or more, condition ii is less than 2 seconds, condition iii is 4 seconds or more, and condition iv is 2 seconds or more, the flow of processing is as per the thick-lined arrow in FIG. 17B.

In pattern C of Table 1, when condition i is 4 seconds or more, condition ii is less than 2 seconds, condition iii is 4 seconds or more, and condition iv is less than 2 seconds, the flow of processing is as per the thick-lined arrow in FIG. 17C.

In pattern D of Table 1, when condition i is 4 seconds or more, condition ii is less than 2 seconds, condition iii is less than 4 seconds, and condition iv is 2 seconds or more, the flow of processing is as per the thick-lined arrow in FIG. 17D.

Figure 18A:
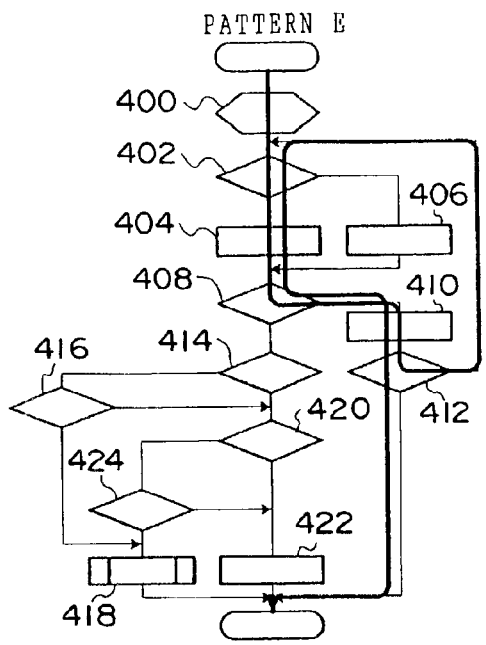
FIG. 18A is a flowchart of pattern E of Table 1 based on the flowchart of FIG. 6.

In pattern E of Table 1, when condition i is 4 seconds or more, condition ii is less than 2 seconds, condition iii is less than 4 seconds, and condition iv is less than 2 seconds, the flow of processing is as per the thick-lined arrow in FIG. 18A.

Figure 18B:
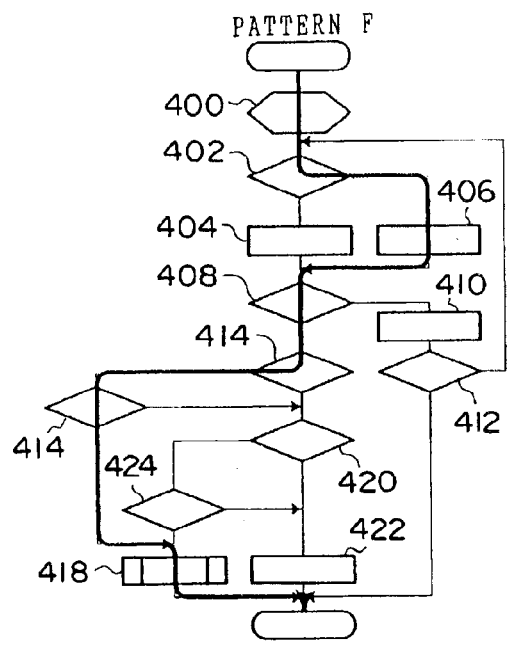
FIG. 18B is a flowchart of pattern F of Table 2 based on the flowchart of FIG. 6.

In pattern F of Table 2, when condition i is less than 4 seconds and condition ii is 2 seconds or more, the flow of processing is as per the thick-lined arrow in FIG. 18B. This corresponds to the case where the operator happens to insert the next printing plate 302 into the processor 304 without the predetermined interval.

Figure 18C:
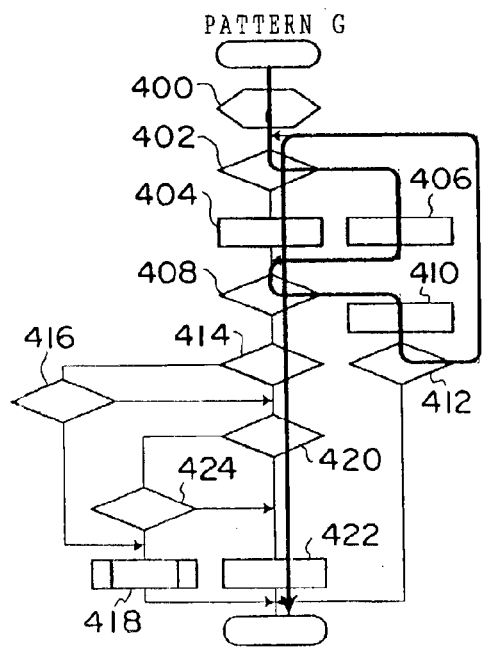
FIG. 18C is a flowchart of pattern G of Table 2 based on the flowchart of FIG. 6.

In pattern G of Table 2, when condition i is less than 4 seconds, condition ii is less than 2 seconds, condition iii is 4 seconds or more, and condition iv is 2 seconds or more, the flow of processing is as per the thick-lined arrow in FIG. 18C. This corresponds to the case where a normal processing of the printing plate is done after the operator's hand or an object held by the operator happens to pass in an instant over the printing plate detecting sensor 322.

Figure 18D:
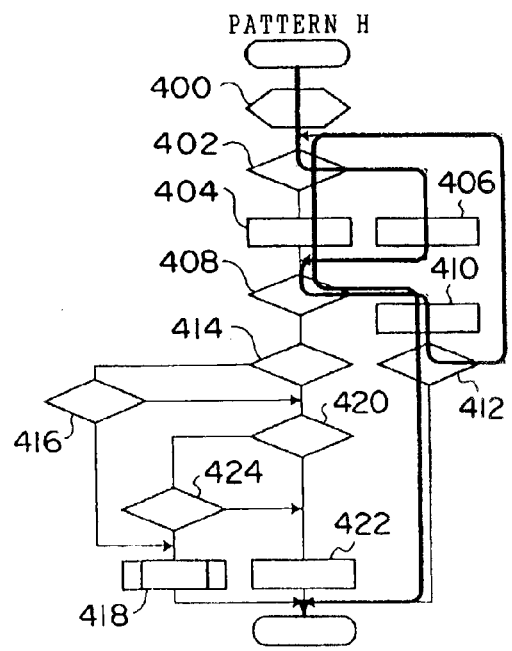
FIG. 18D is a flowchart of pattern H of Table 2 based on the flowchart of FIG. 6.

In pattern H of Table 2, when condition i is less than 4 seconds, condition ii is less than 2 seconds, condition iii is 4 seconds or more, and condition iv is less than 2 seconds, the flow of processing is as per the thick-lined arrow in FIG. 18D.

Figure 19A:
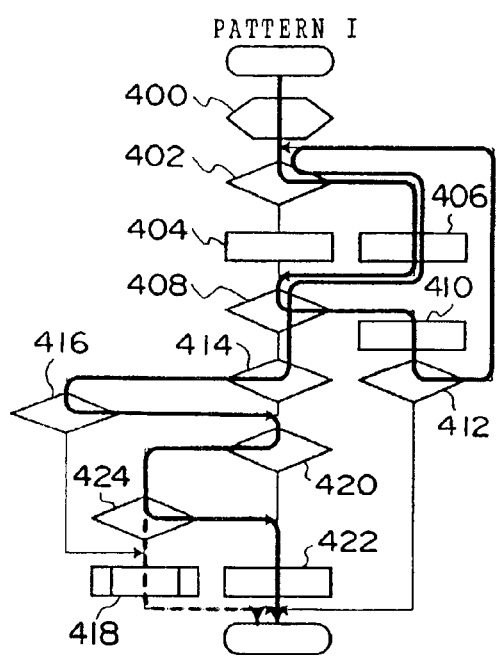
FIG. 19A is a flowchart of pattern I of Table 2 based on the flowchart of FIG. 6.

In pattern I of Table 2, when condition i is less than 4 seconds, condition ii is less than 2 seconds, condition iii is less than 4 seconds, and condition iv is 2 seconds or more, the flow of processing is as per the thick-lined arrow in FIG. 19A.

Figure 19B:
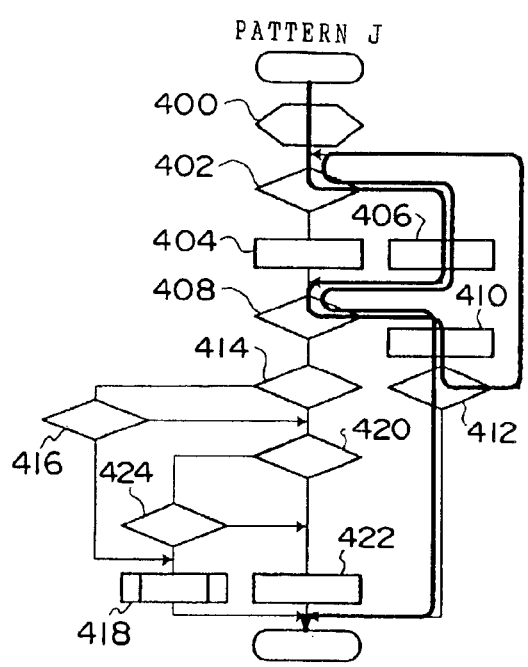
FIG. 19B is a flowchart of pattern J of Table 2 based on the flowchart of FIG. 6.

In pattern J of Table 2, when condition i is less than 4 seconds, condition ii is less than 2 seconds, condition iii is less than 4 seconds, and condition iv is less than 2 seconds, the flow of processing is as per the thick-lined arrow in FIG. 19B.

As described above, in the present embodiment, conditions are provided for repeating patterns of operating time periods, non-operating time periods, and operating time periods/non-operating time periods at the detecting state of the printing plate detecting sensor 322 provided at the upper end portion of the slope 308 of the stocker 300. It is judged whether the printing plate 302 has been processed at the processor 304 with the predetermined timing (authentic detection), or whether the printing plate 302 has been processed not at the predetermined intervals (false detection). Additionally, the stocker 300 is prevented from improper functioning in such a way that re-detecting of the predetermined operating/non-operating time periods by the printing plate detecting sensor 322 is confirmed when the operator's hand or an object held by the operator happens to pass over the printing plate detecting sensor 322.

Namely, non-detection, of 4 seconds or more, of the printing plate 302 by the printing plate detecting sensor 322 is set as the first condition, and detection, of 2 seconds or more, of the printing plate 302 by the printing plate detecting sensor 322 is set as the second condition, and non-detection, of less than 4 seconds, of the printing plate 302 by the printing plate detecting sensor 322 is set as the third condition. When the second condition is established following establishment of the first condition, it is judged that the detection of the leading end portion of the printing plate 302 is authentic. When the second condition is established following the establishment of the third condition, it is judged that the detection of the leading end portion of the printing plate 302 is false.

In this way, needless operation of the hooks 310 and the rotating plate 316 can be prevented, and the work efficiency can be improved. Further, improper functioning, which is a cause of trouble, can be prevented in advance.

The judging processes of the present invention are not limited to the judging routine shown in FIGS. 16A and 16B. In actuality, the processes are carried out over time, but the judging routines for the respective patterns shown in Tables 1 and 2 may be executed simultaneously. However, when the signal of the printing plate detecting sensor 322 switches (from operation to non-operation, or from non-operation to operation), judgement on the establishment/non-establishment of the above-described first condition, second condition and third condition should be possible.

As described above, in accordance with the present invention, an intermediate guide portion can be mounted between the loading portion and the head portion. Operation of a moving device based on the results of detection by a plate detecting device provided at the head portion, is set in accordance with the intermediate guide portion. Thus, an excellent effect is achieved in that, when a printing plate, whose length along the conveying direction is short, is stacked, appropriate stacking of the printing plate is possible while the placement space is small.

In accordance with the present invention, the leading end of a printing plate, which is sliding down the slope, can be prevented from slipping beneath the bottom end of a printing plate which has already been leaned up and stacked against the back plate. When the printing plate is reversed toward the back plate, the leading end portion of the printing plate, which is the bottom end, does not bend. In the present invention, this is because the stoppers, which abut and support the leading end of the printing plate, are provided at the bottom end of the frame which is rotated by the swinging device. In this way, an excellent effect is achieved in that the printing plate can be stacked while damage, such as breakage or bending or the like, of the leading end portion of the printing plate can be reliably prevented.

In accordance with the present invention, an excellent effect is achieved in that, when the leading end portion of a sheet member is used as a trigger for the time of operation of a subsequent process, it is possible to prevent a subsequent process from being activated by detecting whether a sheet material is transferred to a next region at predetermined intervals. Further, it is possible to prevent a subsequent process from being activated even when a foreign object other than a sheet material is detected.

What is claimed is:

1. A method for judging authenticity of a state of detection of a sensor, the method being used in an operation controller comprising the sensor for detecting a leading edge of a sheet member which is being conveyed, the operation controller using detection of the leading edge of the sheet member by the sensor as a trigger for a timing of operation of a subsequent process, the method comprising:

judging that the detection of the leading edge of the sheet member is authentic when the detection by the sensor for a predetermined time or longer is established after non-detection of the sheet member for another predetermined time or longer; and proceeding to the subsequent process.

2. The method of claim 1, wherein the sheet member is a photosensitive lithographic printing plate, the step of proceeding to the subsequent process comprises transferring the photosensitive lithographic printing plate to a stocker, the stocker is provided corresponding to an exit of the step of judging, and the photosensitive lithographic printing plate passes the exit.

3. The method of claim 2, wherein the stocker comprises a slope for guiding the photosensitive lithographic printing plate downward, a supporting member provided movable along the slope for receiving the leading edge of the photosensitive lithographic printing plate, a rotating plate structured with the slope, and a stocking wall provided facing the slope, the step of transferring comprising guiding the photosensitive lithographic printing plate passed through the exit along the slope, receiving the leading edge of the photosensitive lithographic printing plate by the supporting member, moving the rotating plate for passing the photosensitive lithographic printing plate to the stocking wall.

4. A method for judging authenticity of a state of detection of a sensor, the method being used in an operation controller comprising the sensor for detecting a leading edge of a sheet member which is being conveyed, the operation controller using detection of the leading edge of the sheet member by the sensor as a trigger for a timing of operation of a subsequent process, the method comprising:

judging that the detection of the leading edge of the sheet member is false when the detection for a predetermined time or longer by the sensor is established after non-detection of the sheet member for a time less than another predetermined time; and carrying out error processing.

5. The method of claim 4, wherein the sheet member is a photosensitive lithographic printing plate, the step of proceeding to the subsequent process comprises transferring the photosensitive lithographic printing plate to a stocker, the stocker is provided corresponding to an exit of the step of judging, and the photosensitive lithographic printing plate passes the exit.

6. The method of claim 5, wherein the stocker comprises a slope for guiding the photosensitive lithographic printing plate downward, a supporting member provided movable along the slope for receiving the leading edge of the photosensitive lithographic printing plate, a rotating plate structured with the slope, and a stocking wall provided facing the slope, the step of transferring comprising guiding the photosensitive lithographic printing plate passed through the exit along the slope, receiving the leading edge of the photosensitive lithographic printing plate by the supporting member, moving the rotating plate for passing the photosensitive lithographic printing plate to the stocking wall.

7. The method of claim 5, wherein the error processing includes stopping of the stocker which is operatably connected to the operation controller.

8. The method of claim 4, wherein the error processing includes stopping of a device which is operatably connected to the operation controller.

* * * * *